(12) United States Patent
Jung et al.

(10) Patent No.: US 11,260,998 B2
(45) Date of Patent: Mar. 1, 2022

(54) VACUUM SUCTION NOZZLE AND VACUUM SUCTION APPARATUS INCLUDING THE SAME

(71) Applicant: Samsung Electronics Co., Ltd, Suwon-si (KR)

(72) Inventors: Hae Yong Jung, Suwon-si (KR); Seung Hoon Kal, Uiwang-si (KR); Se Won Yook, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 15/759,496

(22) PCT Filed: Sep. 2, 2016

(86) PCT No.: PCT/KR2016/009862
§ 371 (c)(1),
(2) Date: Mar. 12, 2018

(87) PCT Pub. No.: WO2017/043814
PCT Pub. Date: Mar. 16, 2017

(65) Prior Publication Data
US 2018/0251245 A1    Sep. 6, 2018

(30) Foreign Application Priority Data

Sep. 10, 2015  (KR) .......................... 10-2015-0128329

(51) Int. Cl.
*B65B 31/04*    (2006.01)
*B65B 31/06*    (2006.01)
(Continued)

(52) U.S. Cl.
CPC .......... *B65B 31/043* (2013.01); *B65B 31/048* (2013.01); *B65B 31/06* (2013.01);
(Continued)

(58) Field of Classification Search
CPC ... B65B 31/024; B65B 31/043; B65B 31/046; B65B 31/048; B65B 31/06; B65B 43/26;
(Continued)

(56) References Cited

U.S. PATENT DOCUMENTS

| 2,559,368 A | * | 7/1951 | Pancratz | ................. B65B 31/06 |
| | | | | 53/88 |
| 2,626,419 A | * | 1/1953 | Anderson | ................. A47L 9/02 |
| | | | | 15/402 |

(Continued)

FOREIGN PATENT DOCUMENTS

| CN | 1185747 A | 6/1998 |
| CN | 1390438 A | 1/2003 |

(Continued)

OTHER PUBLICATIONS

Office Action dated Aug. 2, 2019 in connection with Chinese Patent Application No. 201680051898.2, 17 pages.

(Continued)

*Primary Examiner* — Joshua G Kotis

(57) ABSTRACT

Disclosed are a vacuum suction nozzle for improving vacuum suction performance and a vacuum suction apparatus including the same. The nozzle includes blade portions extending from both sides thereof so as to reduce a gap occurring between the nozzle and an outer skin material for a vacuum insulation panel (VIP) or other vacuum wrapping paper when the outer skin material or vacuum wrapping paper is sealed, thereby minimizing the occurrence of a leak and thus enabling efficient vacuum suction. Further, the nozzle achieves efficient vacuum suctioning by ensuring a suction channel inside the vacuum insulation panel (VIP) or other vacuum wrapping paper through a protrusion extending to the front of the nozzle.

17 Claims, 18 Drawing Sheets

(51) Int. Cl.
*F16L 59/065* (2006.01)
*B32B 1/00* (2006.01)
*B29C 65/00* (2006.01)

(52) U.S. Cl.
CPC ........ *F16L 59/065* (2013.01); *B29C 66/8322* (2013.01); *B32B 1/00* (2013.01); *B32B 2607/00* (2013.01)

(58) Field of Classification Search
CPC ... B65B 43/34; B65D 81/2038; F16L 59/065; F16L 59/07; A47L 9/02; B29C 66/82661
USPC ................ 53/79, 84, 512, 405, 434; 15/402, 15/415.1–422.1
See application file for complete search history.

(56) References Cited

U.S. PATENT DOCUMENTS

| | | | | |
|---|---|---|---|---|
| 2,629,126 A | * | 2/1953 | Brown, Jr. ................ | A47L 9/02 15/402 |
| 2,749,686 A | * | 6/1956 | Lorenz .................... | B65B 31/06 53/434 |
| 2,889,673 A | * | 6/1959 | Rockland ................ | B29C 66/43 53/512 |
| 3,628,576 A | * | 12/1971 | Owen ..................... | B65B 31/06 141/95 |
| 3,968,629 A | * | 7/1976 | Gidewall ............. | B65B 25/067 53/374.8 |
| 4,170,863 A | * | 10/1979 | Schwanz ................. | B65B 31/04 53/229 |
| 4,221,101 A | * | 9/1980 | Woods .............. | B29C 66/91641 53/79 |
| 4,561,925 A | * | 12/1985 | Skerjanec ............. | B29C 66/861 156/379.6 |
| 4,694,529 A | * | 9/1987 | Choiniere ................ | A47L 9/02 15/393 |
| 5,015,184 A | * | 5/1991 | Perry ..................... | A61C 17/08 433/93 |
| 5,406,776 A | * | 4/1995 | Cappi .................... | B65B 31/043 53/373.6 |
| 5,491,957 A | * | 2/1996 | Maskell ................ | B65B 31/042 53/432 |
| 5,533,230 A | * | 7/1996 | Rouda ...................... | A47L 9/02 15/339 |
| 5,535,478 A | * | 7/1996 | Thompson ................ | A47L 9/02 15/395 |
| 5,701,910 A | | 12/1997 | Powles et al. | |
| 5,737,906 A | * | 4/1998 | Ishimaru ................ | B65B 31/06 53/512 |
| 7,000,311 B1 | | 2/2006 | Reimann | |
| 9,392,918 B2 | | 7/2016 | Tucker et al. | |
| 2002/0050303 A1 | * | 5/2002 | Otsubo ................ | B65B 31/047 141/65 |
| 2002/0166308 A1 | * | 11/2002 | Huang .................... | B65B 31/06 53/512 |
| 2004/0177595 A1 | * | 9/2004 | Kozak .................... | B65B 31/04 53/434 |
| 2005/0102975 A1 | * | 5/2005 | Hughes ................ | B65B 31/042 53/432 |
| 2005/0132669 A1 | * | 6/2005 | Chang .................... | B65B 31/06 53/434 |
| 2006/0053749 A1 | | 3/2006 | Scanlan | |
| 2006/0260280 A1 | * | 11/2006 | Jones .................... | B65B 31/06 53/434 |
| 2012/0090271 A1 | * | 4/2012 | Rearick .................. | B65B 25/04 53/434 |
| 2013/0031871 A1 | * | 2/2013 | Helmsderfer ......... | B65B 31/048 53/408 |
| 2014/0190125 A1 | * | 7/2014 | Rearick .................. | B65B 25/04 53/434 |
| 2016/0144988 A1 | * | 5/2016 | Kwon ................... | B65B 31/048 53/86 |
| 2016/0288937 A1 | * | 10/2016 | Grether .................. | B65B 35/30 |

FOREIGN PATENT DOCUMENTS

| | | | | |
|---|---|---|---|---|
| CN | 104825095 A | | 8/2015 | |
| GB | 2535349 A | * | 8/2016 | .......... A47L 9/0606 |
| JP | S61-0180905 U | | 11/1986 | |
| JP | S62-054907 U | | 4/1987 | |
| JP | S6254907 U | | 4/1987 | |
| JP | S63-032103 U | | 3/1988 | |
| JP | S6332103 U | | 3/1988 | |
| KR | 20-0323092 Y1 | | 8/2003 | |
| KR | 10-2004-0084592 A | | 10/2004 | |
| KR | 20-0389425 Y1 | | 7/2005 | |
| KR | 20060105599 A | | 10/2006 | |
| KR | 20100058861 A | | 6/2010 | |
| WO | WO-9003920 A1 | * | 4/1990 | ............. B65B 31/06 |

OTHER PUBLICATIONS

Extended European Search Report for European Patent Application No. 16844634.2 dated Apr. 3, 2018; 8 pages.
International Search Report dated Dec. 16, 2016 in connection with International Patent Application No. PCT/KR2016/009862.
Written Opinion of The International Searching Authority dated Dec. 16, 2016 in connection with International Patent Application No. PCT/KR2016/009862.
Communication under Rule 71(3) EPC dated Oct. 26, 2018 in connection with European Patent Application No. 16844634.2, 62 pages.
The Second Office Action in connection with Chinese Application No. 201680051898.2 dated Apr. 2, 2020, 17 pages.
The Third Office Action dated Oct. 10, 2020 in connection with Chinese Application No. 201680051898.2, 15 pages.
China National Intellectual Property Administration, "The Fourth Office Action" dated Apr. 2, 2021, in connection with Chinese Patent Application No. 201680051898.2, 8 pages.

* cited by examiner

[Fig. 1]
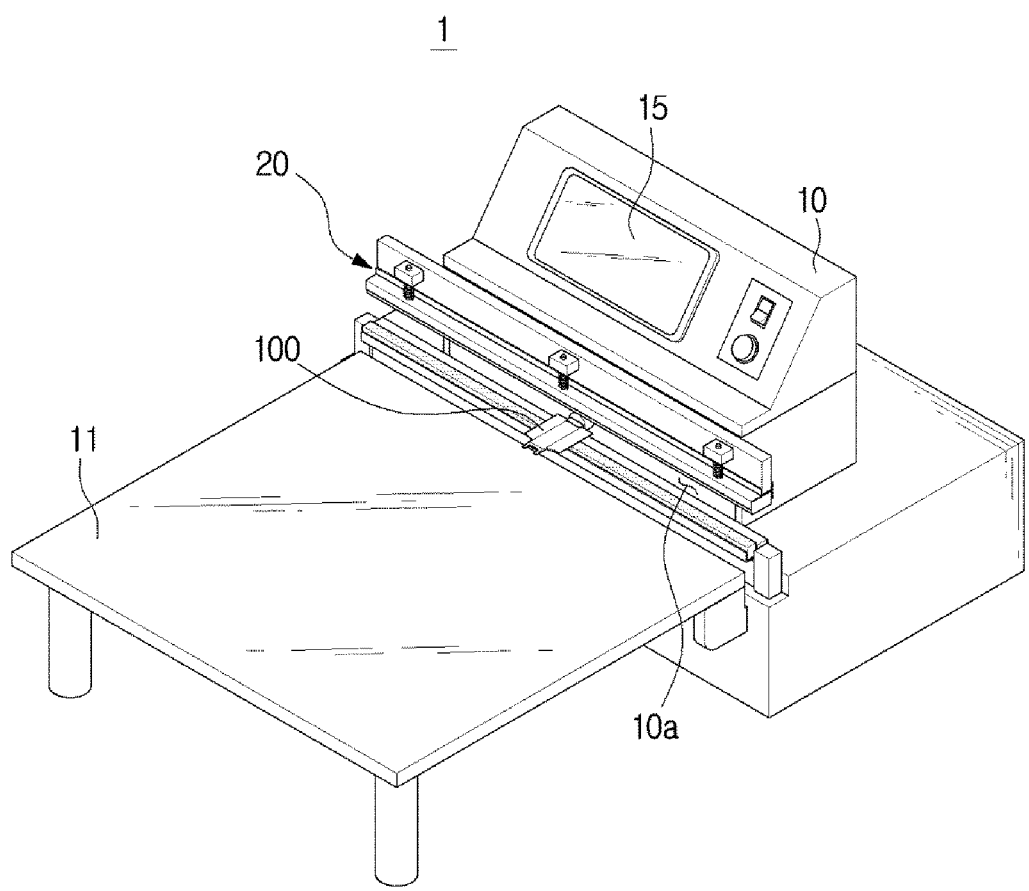

[Fig. 2]
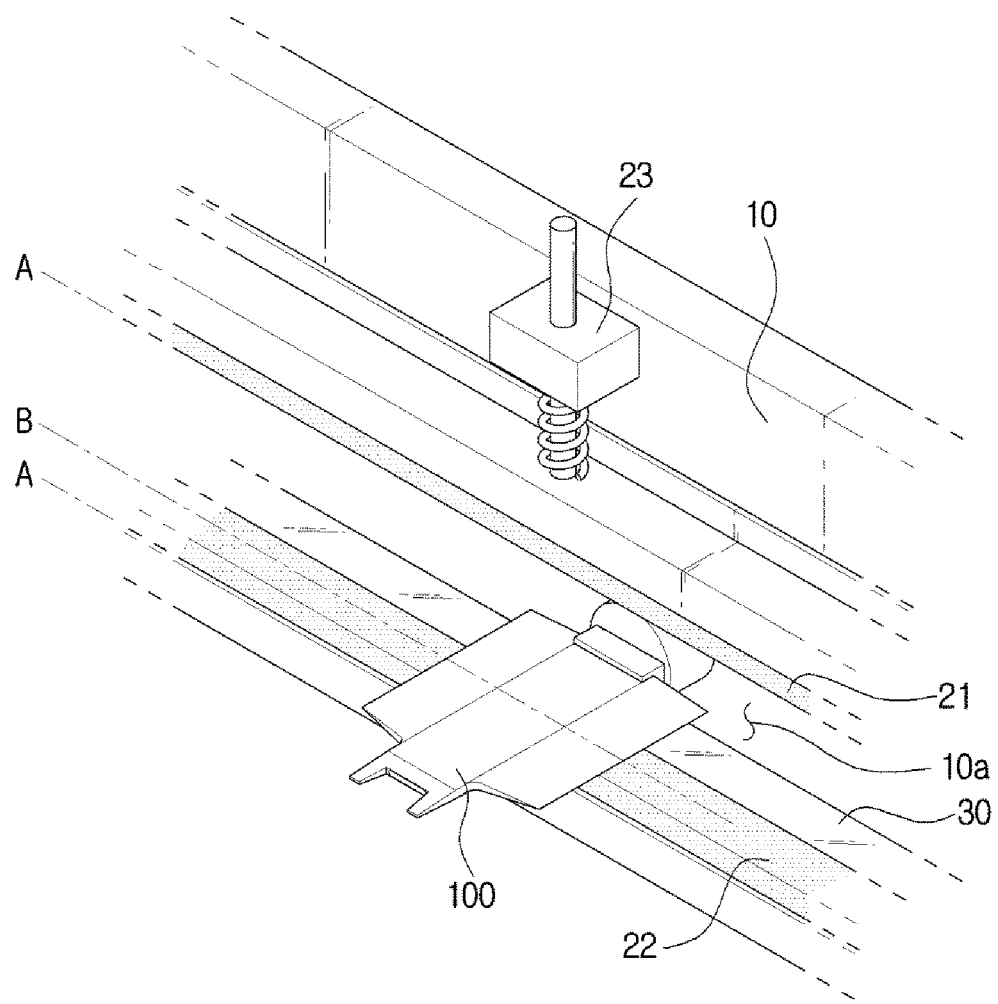

[Fig. 3]
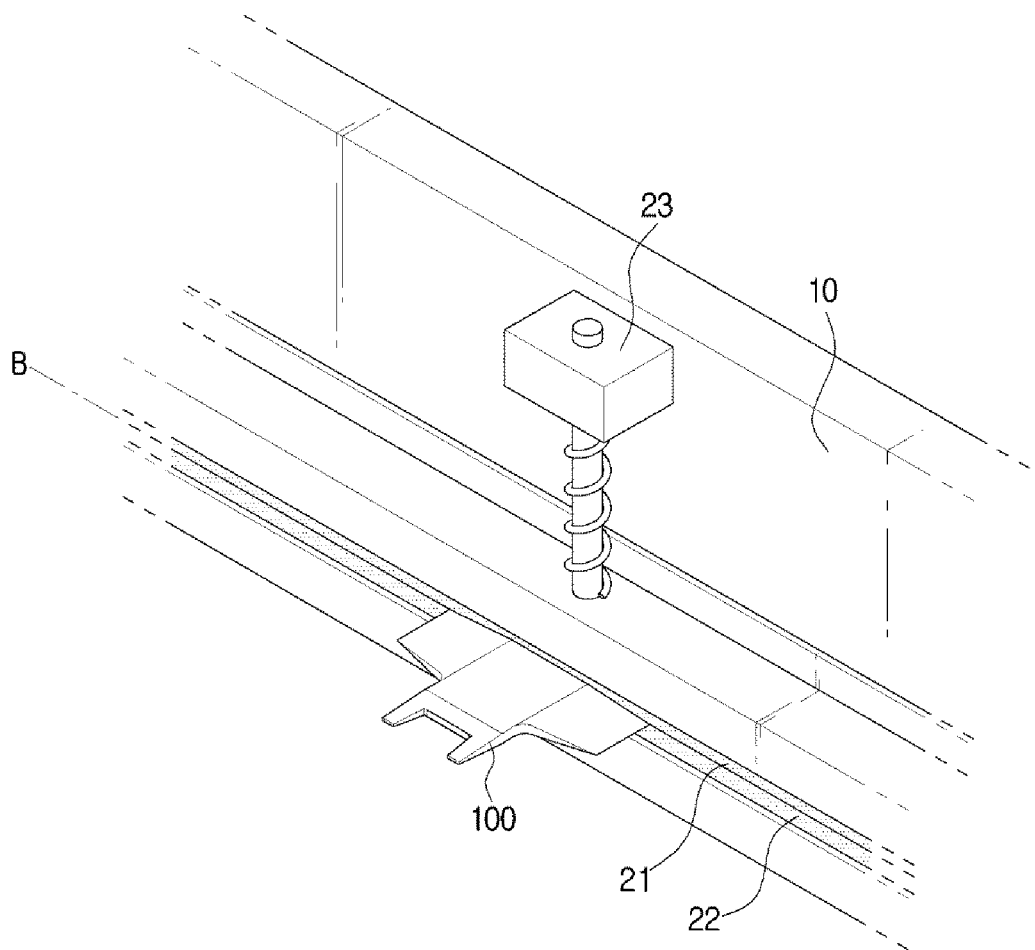

[Fig. 4a]
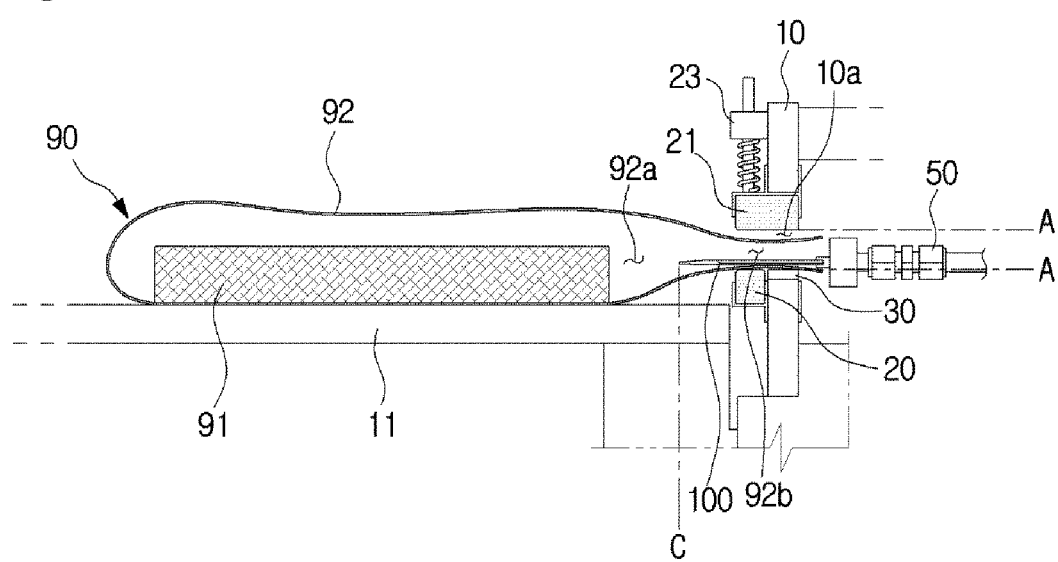

[Fig. 4b]
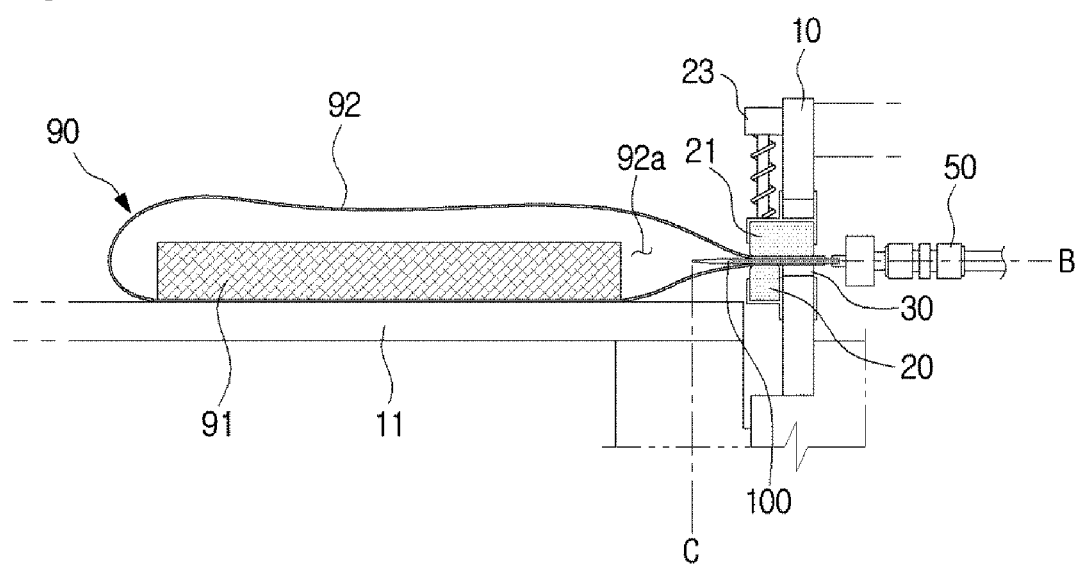

[Fig. 4c]
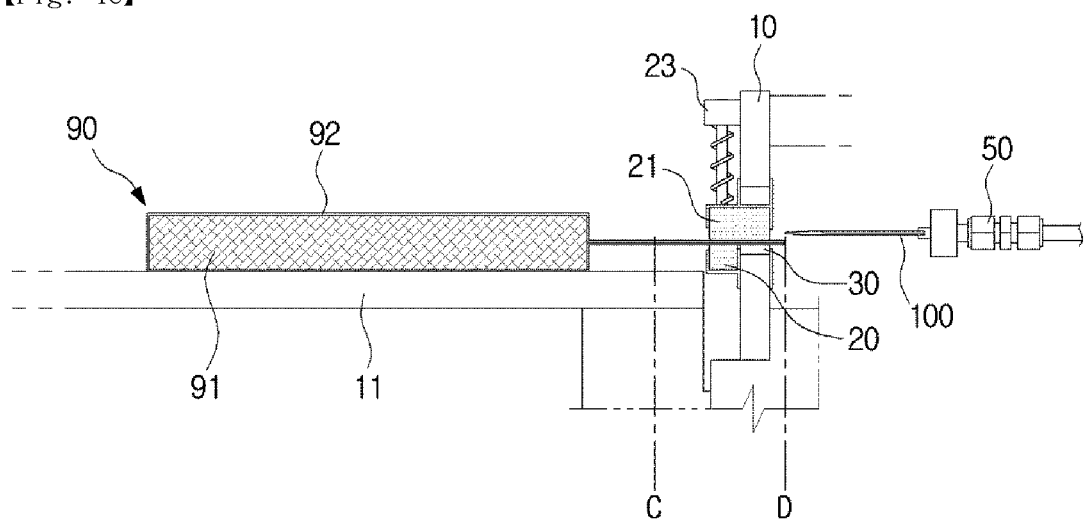

[Fig. 5]
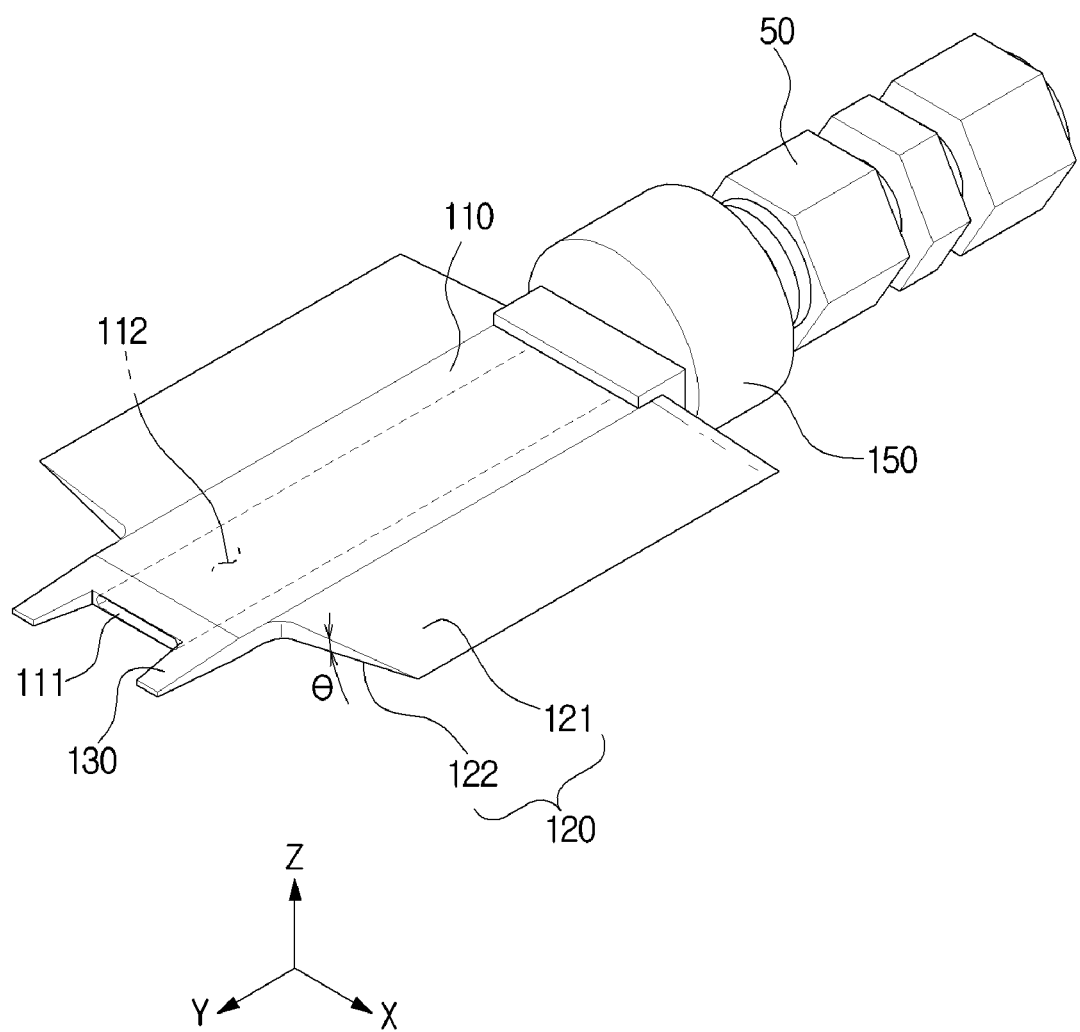

[Fig. 6]
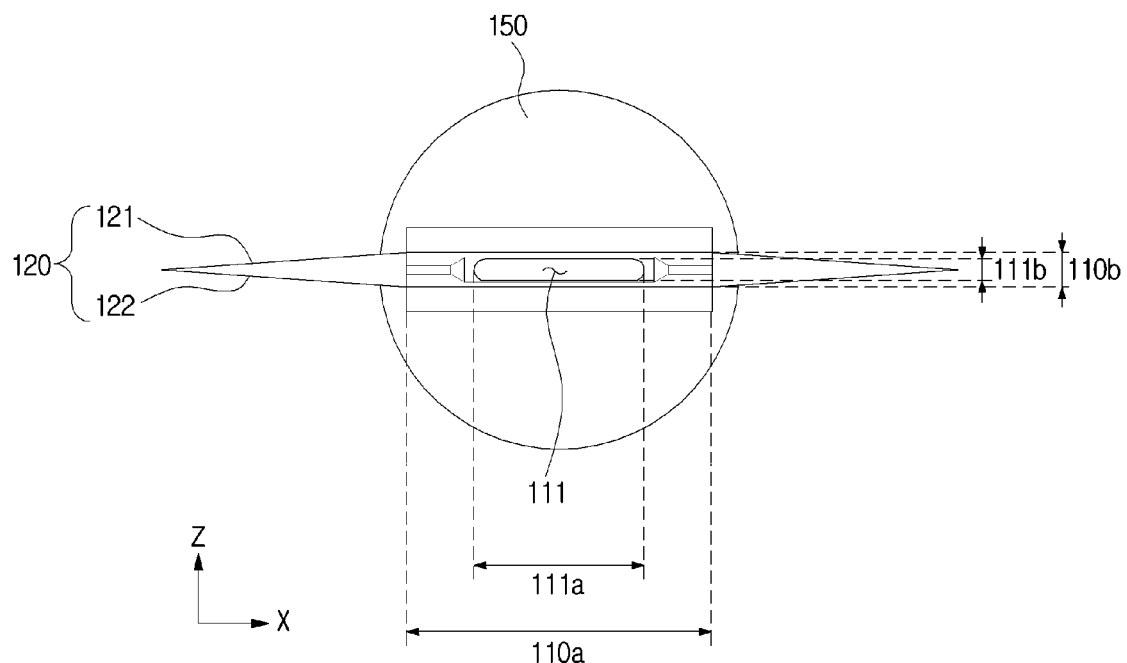

[Fig. 7]
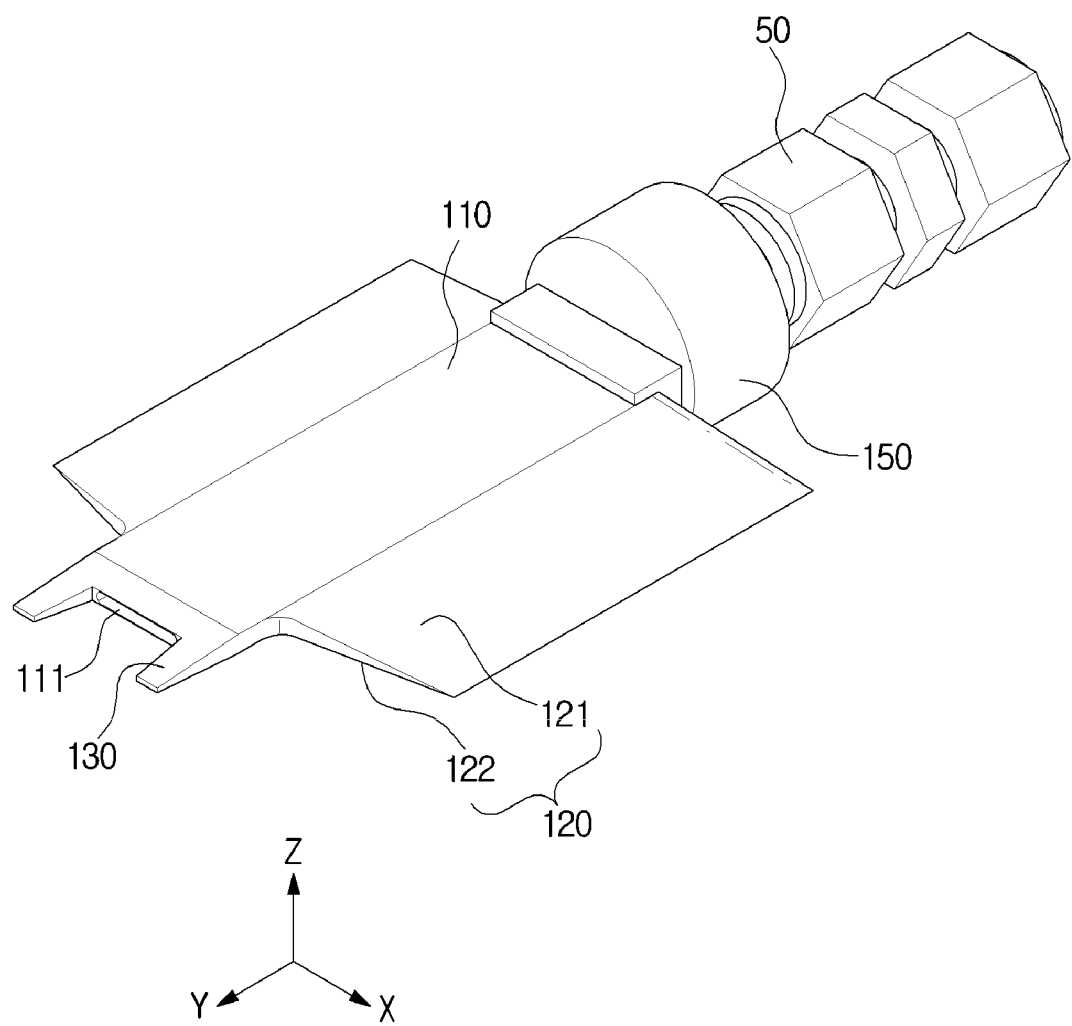

[Fig. 8]
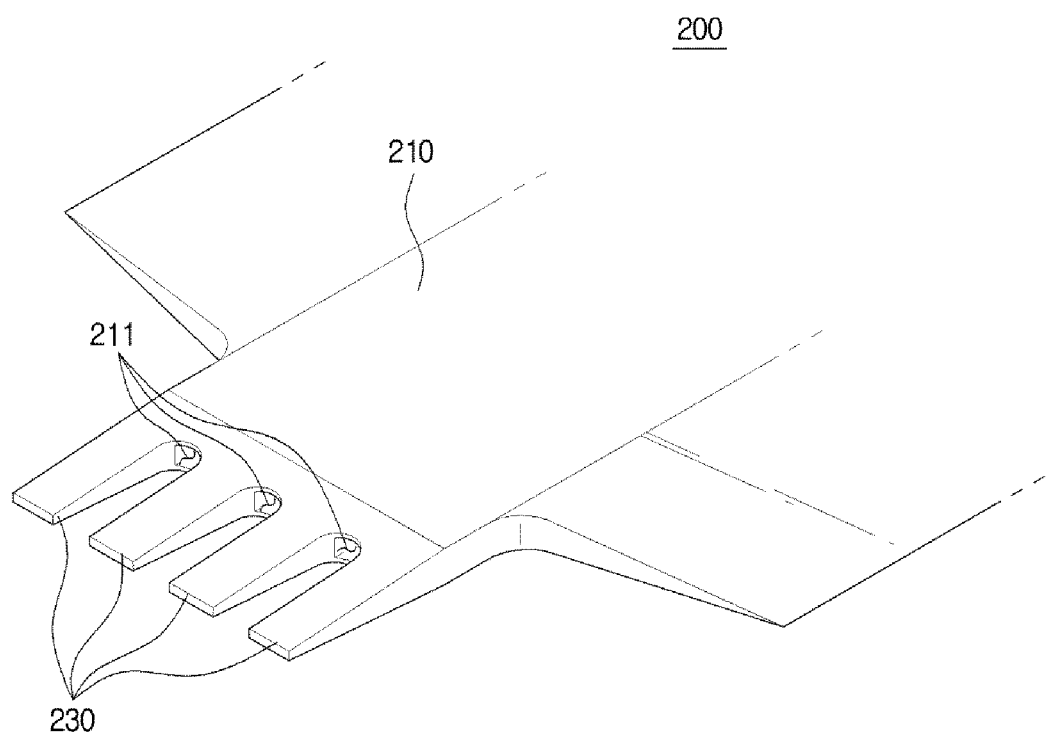

[Fig. 9]
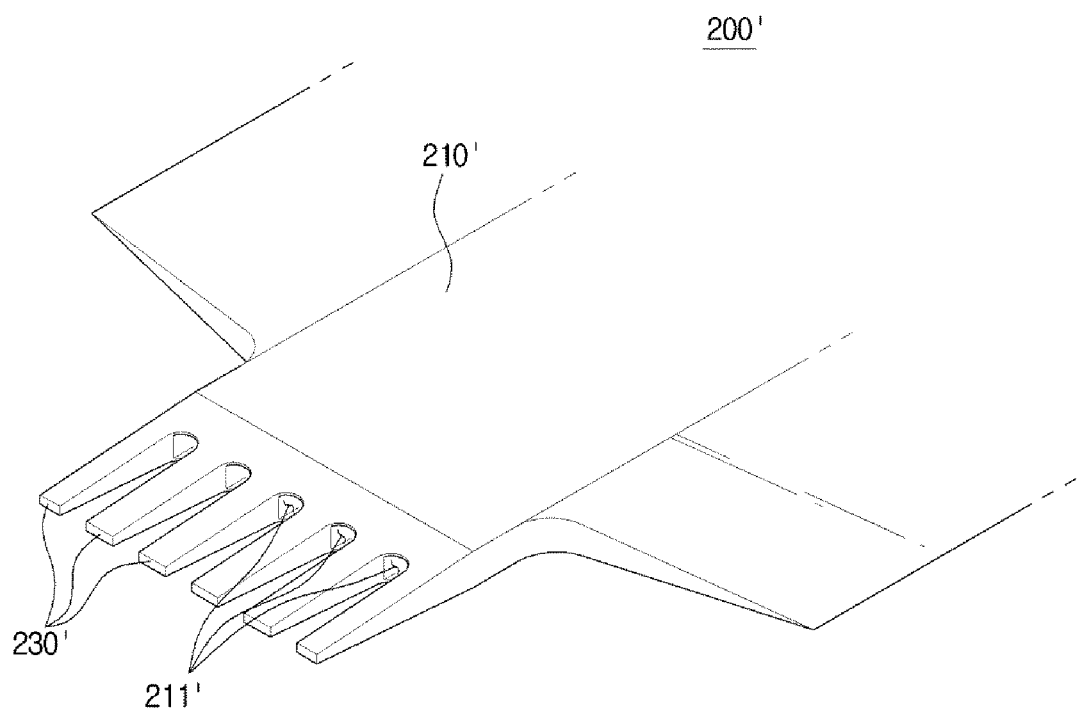

[Fig. 10]
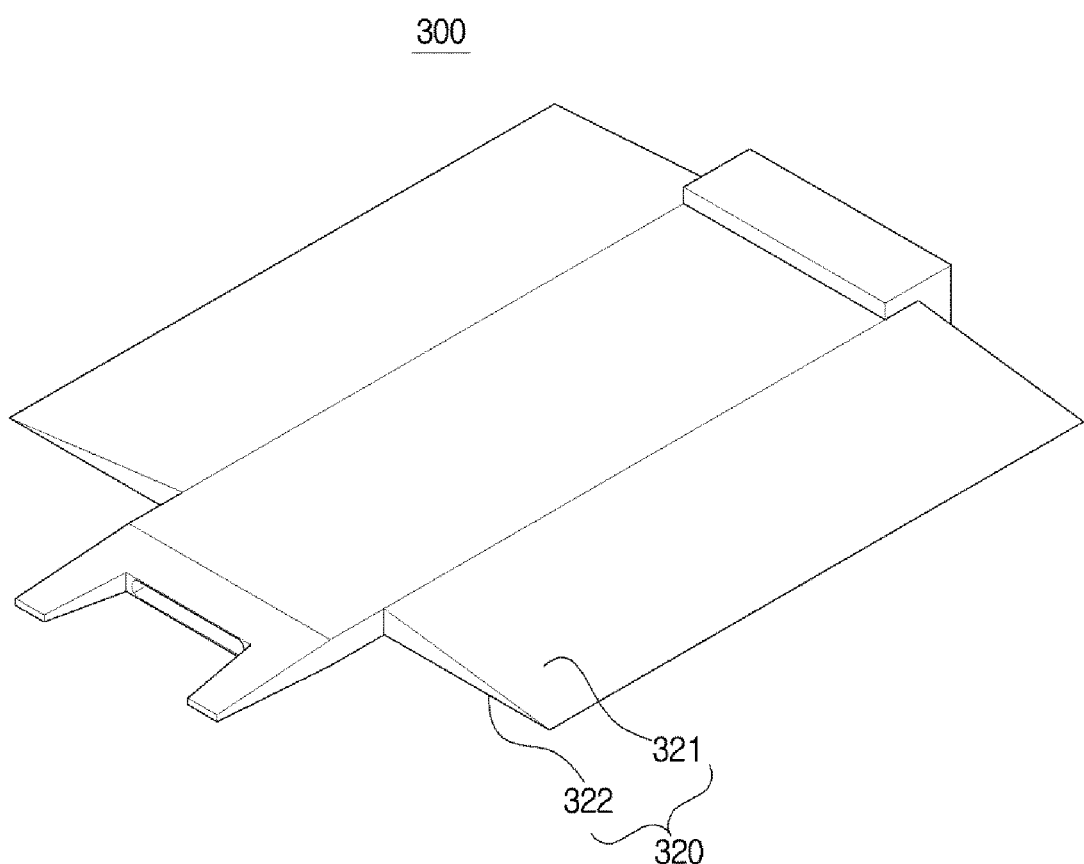

[Fig. 11]
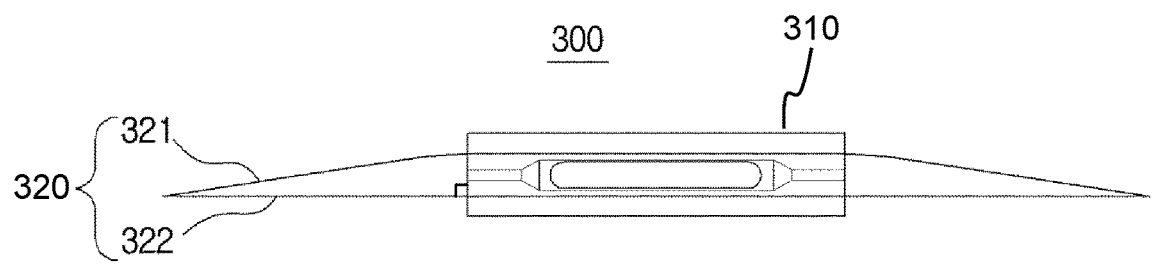

[Fig. 12]
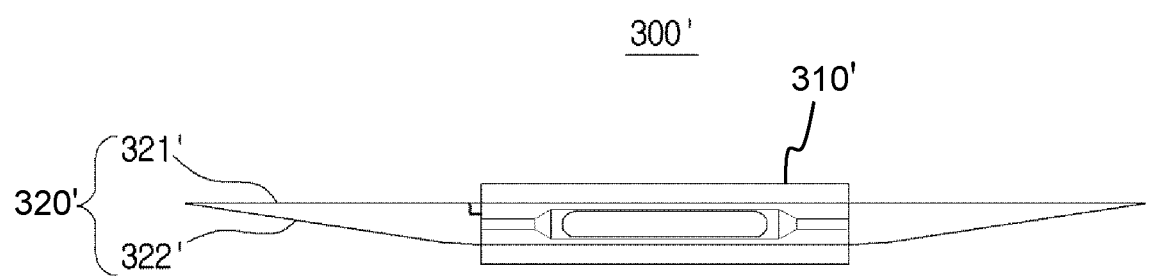

[Fig. 13]
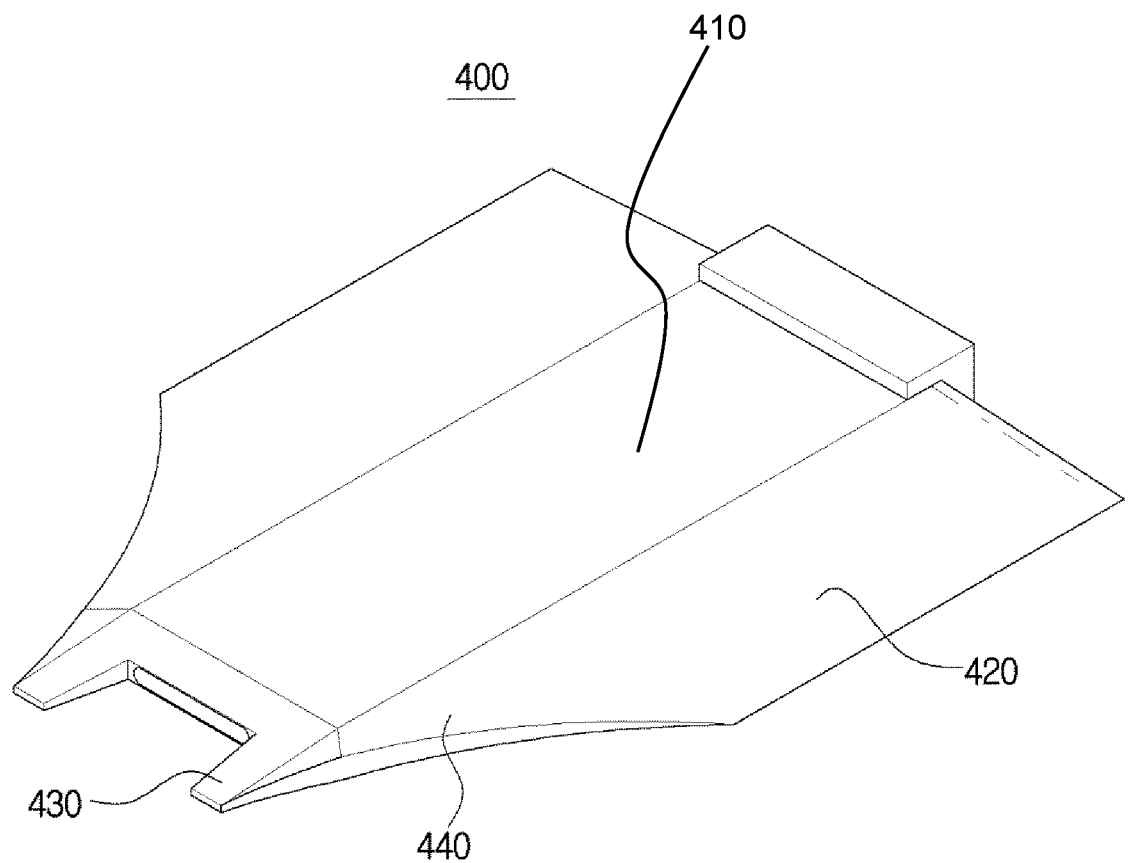

[Fig. 14]
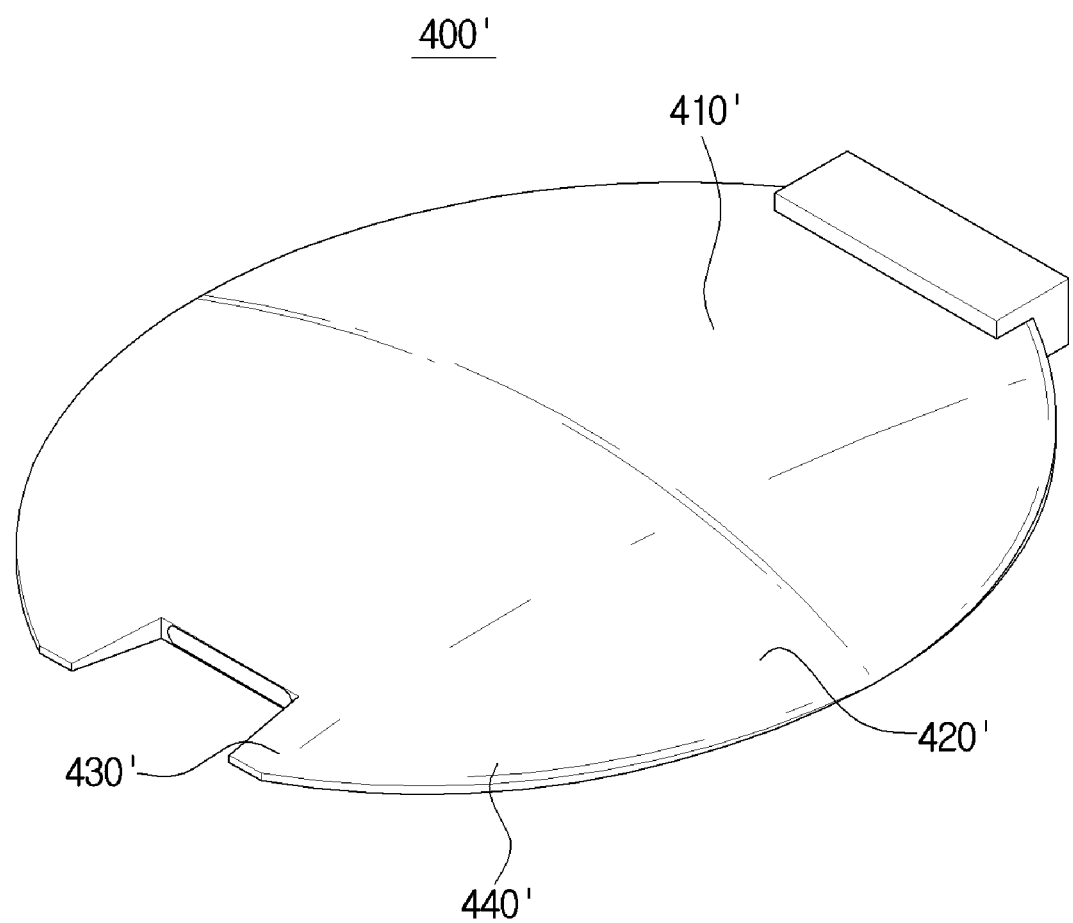

[Fig. 15]
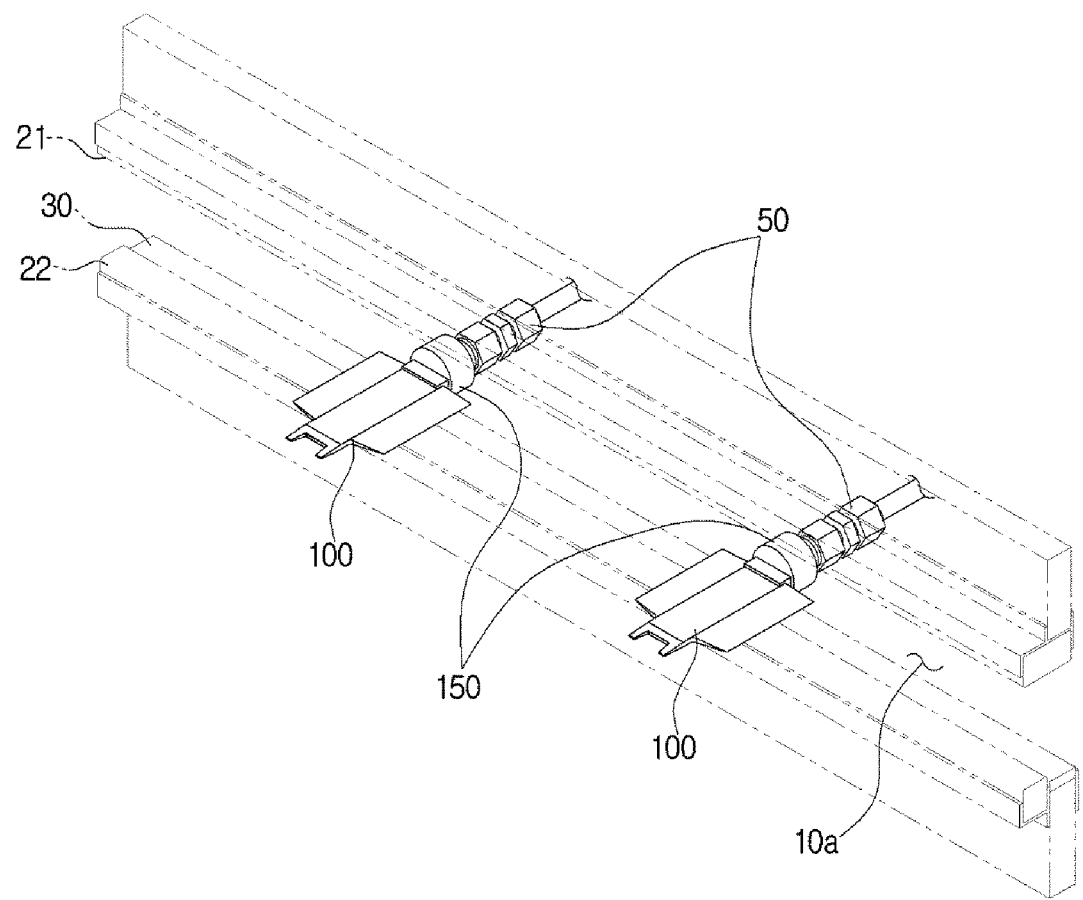

[Fig. 16]
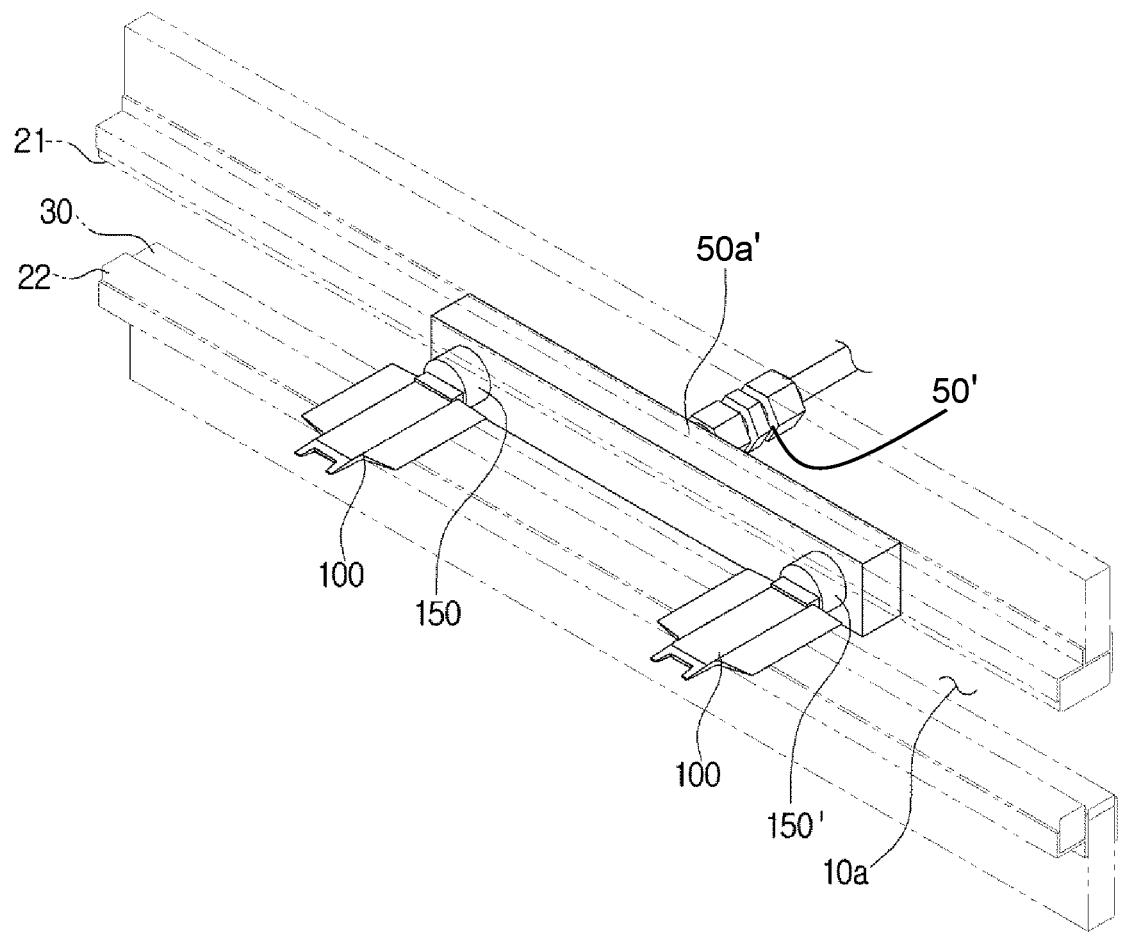

VACUUM SUCTION NOZZLE AND VACUUM SUCTION APPARATUS INCLUDING THE SAME

CROSS-REFERENCE TO RELATED APPLICATION(S)

The present application is a National Phase of International Patent Application No. PCT/KR2016/009862 filed Sep. 2, 2016, which claims priority to Korean Patent Application No. 10-2015-0128329 filed Sep. 10, 2015, which are incorporated herein by reference into the present disclosure as if fully set forth herein.

TECHNICAL FIELD

Embodiments of the present disclosure relate to a vacuum suction nozzle and an apparatus including the same, and more particularly to a vacuum suction nozzle having an improved structure and a vacuum suction apparatus including the same.

BACKGROUND

Total available energy consumable by humans is limited, and global warning caused by carbon dioxide created by energy consumption is the biggest problem facing mankind with energy crisis. Therefore, energy regulation in each country is strengthening day by day, and energy rating (or energy labeling) for household appliances is the biggest concern for manufacturers. The government energy rating system that requires maximum efficiency with less energy is well matched with the demand of consumers who desire high capacity and low power consumption products. Specifically, in recent times, many developers and companies are conducting intensive research into heat loss of household appliances such as a refrigerator, and many attempts are being made to increase energy efficiency by enhancing insulation performance of appliances.

As one of these attempts, it is necessary to use a vacuum insulation panel (VIP) having excellent insulation performance.

In order to further increase insulation performance of the vacuum insulation panel (VIP), the interior of the vacuum insulation panel (VIP) must enter a high vacuum state (or high vacuum level), and must be kept in the high vacuum state. Whereas the interior of the vacuum insulation panel (VIP) may enter the high vacuum state by a conventional vacuum suction apparatus designed to suction air from the interior of the vacuum insulation panel (VIP), a leak may easily occur between a suction nozzle of the vacuum suction apparatus and the vacuum insulation panel (VIP), such that it is difficult to form a vacuum using the conventional vacuum suction apparatus.

The above-mentioned problems have occurred not only in a manufacturing process of vacuum insulation panels (VIPs), but also in a process of vacuum-packing foods and other goods.

SUMMARY

An object of the present disclosure is to provide a nozzle having an improved structure capable of effectively forming a vacuum and a vacuum suction apparatus including the same, which can form a vacuum in a vacuum insulation panel (VIP) and can form a vacuum in a vacuum pouch.

The objects of the present disclosure can be achieved by providing a vacuum suction apparatus including a nozzle formed to suction. The nozzle includes a suction portion and a blade portion. The suction portion is configured to suction air, extend in a first direction, and have a height defined in a second direction. The blade portion is configured to extend in the first direction from at least one side of the suction portion, and have a height defined in the second direction, wherein a length of the height of one side of the blade portion adjacent to the suction portion is longer than a length of a height of an outer end of the blade portion.

The blade portion may include a first side extending from a side portion of the suction portion, and a second side extending from an opposite side of the first side so as to face the first side. A distance between one end of the first side brought into contact with the suction portion and one end of the second side brought into contact with the suction portion in the second direction is longer than a distance between an other end of the first side located at an outer side of the suction portion and an other end of the second side located at an outer side of the suction portion.

The other end of the first side is brought into contact with the other end of the second side.

A separation distance between one end of the first side formed in the second direction and one end of the second side formed in the second direction may be equal to or less than 5 cm.

An angle formed by arrangement of the first and second sides may be in a range of 0.1° to 30°.

The vacuum suction apparatus may further include a protrusion portion configured to extend from a front side portion of the suction portion, and protrude in a third direction crossing the first direction.

One pair of the blade portions may be provided at both sides of the suction portion, and the respective blade portions may be provided to have different sizes.

The suction portion may include a suction inlet provided at a front of the suction portion so as to perform air suction, and a suction channel configured to extend from the suction inlet in a third direction crossing the first direction.

A ratio of a first maximum length of the suction inlet formed in the first direction to a second maximum length of the suction inlet formed in the second direction may be denoted by at least 5:1.

A length of a height of one end of the protrusion portion adjacent to the suction portion may be longer than a length of a height of the other end of the protrusion portion located at an outer side of the suction portion.

The protrusion portion may include a top surface configured to extend in the third direction from an upper side of the front side portion of the suction portion, and a bottom surface configured to extend in the third direction from a lower side of the front side portion of the suction portion so as to face the first surface, wherein an angle formed by arrangement of the top surface and the bottom surface is in a range of 0.1° to 60°.

The protrusion portion may protrude from both sides of the front side portion of the suction portion formed in the first direction, such that one pair of protrusion portions is provided.

The protrusion portion may include a plurality of protrusion portions respectively protruding from the suction portion in the third direction, wherein a suction inlet for air suction is provided between the plurality of protrusion portions.

The nozzle may include a plurality of nozzles.

The vacuum suction apparatus may further include a vacuum pump configured to form a suction force. A rear part of each nozzle may be provided with a nozzle connector for allowing the nozzle to communicate with the vacuum pump.

The nozzle may include a plurality of nozzles, and the nozzle connector may be formed to communicate with the plurality of nozzles.

In accordance with another aspect of the present disclosure, a vacuum suction apparatus includes a nozzle formed to suction air. The nozzle includes a first region, a second region, and a suction channel. The first region includes a suction inlet formed to suction air as well as to extend in a first direction, and has a height defined in a second direction. The second region extends in a third direction crossing the first direction, is located at a rear of the first region, and has a height defined in the second direction. The suction channel extends from the suction inlet in the third direction, and passes through the first region and the second region. A first length of the first region provided in the first direction is shorter than a second length of the second region provided in the first direction.

The nozzle may include a suction portion, a blade portion, and a protrusion portion. The suction portion may include the suction inlet and the suction channel. The blade portion may extend from at least one side of the suction portion in the first direction, and may have a height defined in the second direction. The protrusion portion may protrude from the suction portion in the third direction. Some parts of the suction portion and the protrusion portion may be provided in the first region, and other parts of the suction portions and the blade portion may be provided in the second region.

A ratio of the first length to the second length is denoted by at least 1:2.

A length of a height of both ends of the first region provided in the first direction may be longer than a length of a height of both ends of the second region provided in the first direction.

The vacuum suction apparatus may further include an extension portion formed to connect both ends of the first region to both ends of the second region in a round shape.

A length of a height of one side of the first region in the third direction may be longer than a length of a height of the other side of the first region in the third direction.

A length of a height of a center part of the second region provided in the first direction may be longer than a length of a height of both ends of the second region provided in the first region.

A length of a height of the center part of the second region provided in the first direction is equal to or less than 5 cm.

The blade portion may include a first side extending from a side portion of the suction portion, and a second side extending from an opposite side of the first side so as to face the first side. A distance between one end of the first side contacting the suction portion formed in the second direction and one end of the second side contacting the suction portion in the second direction may be longer than a distance between the other end of the first side located at an outer side of the suction portion and the other end of the second side located at the outer end of the suction portion.

The other end of the first side is brought into contact with the other end of the second side.

An angle formed by arrangement of the first and second sides may be in a range of 0.1° to 30°.

The protrusion portion may include one pair of protrusion portions. one pair of protrusion portions may respectively protrude in the third direction from both ends of the suction inlet provided in the first direction.

A length of a height of one end of the one pair of protrusion portions may be longer than a length of a height of the other ends (located at an outer side of the suction inlet) of the one pair of protrusion portions.

In accordance with another aspect of the present disclosure, a nozzle for vacuum suction includes a suction portion, a blade portion, and at least one protrusion portion. The suction portion is configured to suction air, extend in a first direction. The blade portion extends in the first direction from at least one side of the suction portion. The at least one protrusion portion may protrude from the suction portion in a direction crossing the first direction.

The blade portion may include a first side extending from a side portion of the suction portion, and a second side extending from an opposite side of the first side so as to face the first side. A distance between one end of the first side contacting the suction portion and one end of the second side contacting the suction portion may be longer than a distance between the other end of the first side located at an outer side of the suction portion and the other end of the second side located at the outer end of the suction portion.

A separation distance between one end of the first side and one end of the second side may be equal to or less than 5 cm.

The suction portion may include a suction inlet and a tube-shaped suction channel. The suction inlet is provided at a front side portion of the suction portion and suctions the air. The tube-shaped suction channel extends from the suction inlet in a direction crossing the first direction.

The suction inlet may extend in the first direction.

In accordance with another aspect of the present disclosure, a vacuum suction apparatus includes a main body having an opening, a sealing unit provided in the opening so as to seal an opened part of an outer skin material, and a nozzle configured to suction air from an interior of the outer skin material so as to pass through the sealing unit. The nozzle includes a first region and a second region. The first region includes a suction inlet formed to suction air as well as to extend in a first direction. The second region extends in a direction crossing the first direction, is located at a rear of the first region. A first length of the first region provided in the first direction is shorter than a second length of the second region provided in the first direction.

As is apparent from the above description, the nozzle and the vacuum suction apparatus including the same according to embodiments of the present disclosure have the following effects. The nozzle is provided with a blade portion so as to minimize the size of a leak formable when air is suctioned from the interior of a vacuum insulation panel (VIP) or vacuum pouch, such that the vacuum suction apparatus including the nozzle may efficiently suction the air from the interior of the vacuum insulation panel (VIP) or vacuum pouch, resulting in vacuum formation.

BRIEF DESCRIPTION OF THE DRAWINGS

The accompanying drawings, which are included to provide a further understanding of the invention, illustrate embodiments of the invention and together with the description serve to explain the principle of the invention.

FIG. 1 is a perspective view illustrating an external appearance of a vacuum suction apparatus according to an embodiment of the present disclosure.

FIG. 2 is an enlarged perspective view illustrating some parts of the vacuum suction apparatus shown in FIG. 1.

FIG. 3 is an enlarged perspective view illustrating some parts of the vacuum suction apparatus sealing a target object according to an embodiment of the present disclosure.

FIGS. 4A to 4C are conceptual diagrams illustrating methods for forming a vacuum in a vacuum insulation panel (VIP) by the vacuum suction apparatus according to an embodiment of the present disclosure.

FIG. 5 is a perspective view illustrating an external appearance of a nozzle according to an embodiment of the present disclosure.

FIG. 6 is a front view illustrating a nozzle according to an embodiment of the present disclosure.

FIG. 7 is a perspective view illustrating an external appearance of a nozzle according to another embodiment of the present disclosure.

FIG. 8 is a perspective view illustrating an external appearance of a nozzle according to another embodiment of the present disclosure.

FIG. 9 is a perspective view illustrating an external appearance of a nozzle according to another embodiment of the present disclosure.

FIG. 10 is a perspective view illustrating an external appearance of a nozzle according to another embodiment of the present disclosure.

FIG. 11 is a front view illustrating a nozzle according to another embodiment of the present disclosure.

FIG. 12 is a front view illustrating a nozzle according to another embodiment of the present disclosure.

FIG. 13 is a perspective view illustrating an external appearance of a nozzle according to another embodiment of the present disclosure.

FIG. 14 is a perspective view illustrating an external appearance of a nozzle according to another embodiment of the present disclosure.

FIG. 15 is a perspective view illustrating some parts of the external appearance of the vacuum suction apparatus according to another embodiment of the present disclosure.

FIG. 16 is a perspective view illustrating some parts of the external appearance of the vacuum suction apparatus according to another embodiment of the present disclosure.

DETAILED DESCRIPTION

Reference will now be made in detail to the embodiments of the present disclosure, examples of which are illustrated in the accompanying drawings, wherein like reference numerals refer to like elements throughout.

The terms used in the present application are merely used to describe specific embodiments and are not intended to limit the present disclosure. A singular expression may include a plural expression unless otherwise stated in the context. In the present application, the terms "including" or "having" are used to indicate that features, numbers, steps, operations, components, parts or combinations thereof described in the present specification are present and presence or addition of one or more other features, numbers, steps, operations, components, parts or combinations is not excluded.

In description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure. The term "and/or" may include a combination of a plurality of items or any one of a plurality of items.

As used herein, the terms "front" or "front side", "rear" or "rear side", and "upper side" or "lower side" will hereinafter be described with reference to a front portion (i.e., a side oriented in a forward direction of FIG. 1) of the vacuum suction apparatus shown in FIG. 1.

As used herein, the terms "side", "both sides", and "horizontal direction" will hereinafter be described with reference to left and right directions on the basis of a side facing the front of the vacuum suction apparatus shown in FIG. 1.

Specifically, the term "height" may denote a vertical length formable with respect to the vacuum suction apparatus of FIG. 1, and directivity of the length may be changed in different directions (i.e., an upward or downward direction, a left or right direction, and a forward or backward direction) according to arrangement of constituent elements.

The nozzle and the vacuum suction apparatus including the same according to one embodiment of the present disclosure may be applied to a vacuum pouch having one side opened to form a vacuum therein and other goods. For convenience of description, a vacuum insulation panel (VIP) will hereinafter be described as an example of a target object having a vacuum therein. Therefore, the scope or spirit of the present disclosure is not limited to a process for forming a vacuum in the vacuum insulation panel (VIP), and is also applicable to a process for forming a vacuum in other vacuum pouch.

The vacuum insulation panel (VIP) is typically sealed with an outer skin material thereof in a vacuum chamber, resulting in formation of a vacuum in the vacuum insulation panel (VIP). However, when the vacuum chamber is used to form a vacuum, the size and production cost of the vacuum insulation panel (VIP) may unavoidably increase, such that production efficiency may be deteriorated and it may be difficult to maintain a vacuum in the vacuum chamber. Therefore, the following nozzle-type vacuum suction apparatus to be described in the present disclosure will be used to form a vacuum in the vacuum insulation panel (VIP).

The nozzle and the vacuum suction apparatus including the same according to embodiments of the present disclosure will hereinafter be described with reference to the attached drawings.

FIG. 1 is a perspective view illustrating an external appearance of a vacuum suction apparatus according to an embodiment of the present disclosure. FIG. 2 is an enlarged perspective view illustrating some parts of the vacuum suction apparatus shown in FIG. 1. FIG. 3 is an enlarged perspective view illustrating some parts of the vacuum suction apparatus sealing a target object according to an embodiment of the present disclosure. FIGS. 4A to 4C are conceptual diagrams illustrating methods for forming a vacuum in a vacuum insulation panel (VIP) by the vacuum suction apparatus according to an embodiment of the present disclosure.

Referring to FIGS. 1 to 4C, the vacuum suction apparatus 1 may include a main body 10 forming an external appearance thereof and having one open side, a rack 11 for enabling a vacuum insulation panel (VIP) to be loaded onto a front portion of the main body 10, a sealing unit 20 provided at the opened side of the main body 10, and a nozzle 100 configured to pass through the sealing unit 20 at the open side of the main body 10.

The main body 10 may be formed in a casing shape as shown in FIG. 1. However, the scope or spirit of the present disclosure is not limited thereto, and the main body 10 may also be formed in a frame shape that is wholly opened such that constituent elements of the main body 10 are opened to the outside.

The front portion of the main body may be provided with the rack 11 on which the vacuum insulation panel (VIP) 90 is loaded. The rack 11 may be formed in various shapes according to the size of the loaded vacuum insulation panel (VIP) 90. That is, the rack 11 may be longer or shorter in length than a horizontal length of the main body 10, and the height at which the rack 11 is located may also be changed in various ways.

The length and height of the rack 11 may be changeable by a manipulation portion (not shown).

The vacuum insulation panel (VIP) 90 loaded on the rack 11 may include a core material 91 and an outer skin material 92 as shown in FIG. 4.

The core material 91 may include a glass fiber having excellent insulation performance. The core material 91 may be formed in a laminated structure of panels woven with ultra-thin glass fibers so as to obtain the excellent insulation performance. In more detail, as the size of a pore (i.e., a gap) between glass fibers is gradually reduced, radiation indicating insulation performance is less affected, resulting in implementation of higher insulation performance.

The outer skin material 92 may enable the interior of the vacuum insulation panel (VIP) 90 to be kept in a vacuum so as to prevent minute gases and moisture from penetrating the vacuum insulation panel (VIP) 90, such that the insulation effects of the core material 91 and a lifetime of the vacuum insulation panel (VIP) 90 are maintained.

Therefore, the outer skin material 92 may be arranged to surround an outer side of the core material 91. That is, the outer skin material 92 may form an accommodation space 92a in which the core material 91 is accommodated.

One side of the outer skin material 92 may include an opening portion 92b that is open or exposed to outside air. One side of the outer skin material 92 may communicate with the accommodation space 92a provided in the outer skin material 92 through the opening portion 92b, and the core material 91 may be inserted into the accommodation space 92a through the opening portion 92b during a fabrication process of the vacuum insulation panel (VIP) 90.

Thereafter, air is suctioned from the opening portion 92b by the vacuum suction apparatus 1 such that a vacuum space is formed and sealed, resulting in formation of a vacuum in the vacuum insulation panel (VIP) 90. A detailed description thereof will hereinafter be given.

One side of the front of the main body 10 may be provided with an opening, and an accommodation portion 10a capable of accommodating some parts of the outer skin material 90 therein may be provided in the opening. In more detail, the opening portion 92b of the outer skin material 92 and one side of the outer skin material 92 adjacent to the opening portion 92b may be loaded or deposited on the rack 11 and may then be accommodated in the accommodation portion 10a.

An opening of the accommodation portion 10a may be provided with the sealing unit 20.

The sealing unit 20 may include a first sealing member 21 and a second sealing member 22 respectively provided to an upper end and a lower end of the opening of the accommodation portion 10a, and a drive member 23 to enable the first and second sealing members 21 and 22 to perform reciprocate movement in upward and downward directions.

The first sealing member 21 and the second sealing member 22 may be respectively provided at two first positions A that are respectively provided at an upper end and a lower end of the opening of the accommodation portion 10a and are spaced apart from each other, as shown in FIG. 4A.

The drive member 23 may be provided at an upper end of the first sealing member 21 or at a lower end of the second sealing member 22, and may press the first and second sealing members 21 and 22 to face each other so that the first and second sealing members 21 and 22 are brought into contact with each other at a second position B by the drive member 23.

Thereafter, when the first and second sealing members 21 and 22 are located at the second position B, the drive member 23 may also perform pressing in an opposite direction to the facing direction of the first and second sealing members 21 and 22 so that the first and second sealing members 21 and 22 may move back to the first positions A.

Therefore, the first and second sealing members 21 and 22 may be provided at the first positions A spaced apart from each other. That is, the first sealing member 21 and the second sealing member 22 may vertically reciprocate between the second position B and the first positions A by the drive member 23.

The drive member 23 may be provided at one side of each of the first and second sealing members 21 and 22, and may be selectively provided at one side of the first sealing member 21 or the second sealing member 22.

In this case, when the drive member 23 is provided only at one side of the first sealing member 21, the second position B may be located close to an arrangement position of the second sealing member 22 on the first positions A. Conversely, when the drive member 23 is provided only at one side of the second sealing member 22, the second position B may be located close to an arrangement position of the first sealing member 21 on the first positions A.

As described above, one side of the opening portion 92b of the vacuum insulation panel (VIP) 90 is accommodated in the accommodation portion 10a. In this case, the one side of the opening portion 92b may pass through a gap between the first sealing member 21 and the second sealing member 22, and may thus be accommodated in the accommodation portion 10a.

When the first and second sealing members 21 and 22 are located at the second position B on the condition that the vacuum insulation panel (VIP) 90 is partially accommodated in the accommodation portion 10a, an upper side and a lower side of the opening portion 92b may be respectively brought into contact with the first sealing member 21 and the second sealing member 22, so that the upper and lower sides of the opening portions 92b may be sealed by pressurization of the drive member 23.

When the opening portion 92b of the vacuum insulation panel (VIP) 90 is sealed because the first and second sealing members 21 and 22 are located at the second position B, air is suctioned from the interior of the vacuum insulation panel (VIP) 90 by a nozzle 100 to be described later, resulting in formation of a vacuum in the vacuum insulation panel (VIP) 90.

The nozzle 100 may be provided in the accommodation portion 10a, and may be located between the first and second sealing members 21 and 22 respectively located at the two first positions A. The nozzle 100 may be connected to a vacuum pump (not shown) generating suction force, and may perform air suction so that a vacuum may be formed in the vacuum insulation panel (VIP) 90.

In more detail, the nozzle 100 may be provided at the second position B, and may also be disposed at a third position C at which the nozzle 100 passes through the sealing unit 20. By a drive portion (not shown), the nozzle 100 moves backward (i.e., moves toward the interior of the accommodation portion 10a), so that the nozzle 100 may be disposed at a fourth position D at which the nozzle 100 is spaced apart from the sealing unit 20.

Thereafter, the nozzle 100 may move forward by the drive portion (not shown) so that the nozzle 100 may move back to the third position C.

In other words, the nozzle 100 may repeatedly reciprocate in forward and backward directions between the first position C and the fourth position D so that the nozzle 100 may pass through the sealing unit 20.

As shown in FIG. 3, when the nozzle 100 is disposed at the third position C, the first and second sealing members 21 and 22 are disposed at the second position B, and the nozzle 100 passes through a gap between the first and second sealing members 21 and 22, so that the opening portion 92b of the vacuum insulation panel (VIP) 90 may be sealed.

In this case, the first and second sealing members 21 and 22 may include a flexible material, so that the first and second sealing members 21 and 22 may be brought into contact with each other without causing a gap (or spacing) there between.

When the opening portion 92b is accommodated in the accommodation portion 10a, the first and second sealing members 21 and 22 are disposed at the second position B on the condition that the nozzle 100 is disposed at the third position C. Accordingly, the opening portion 92b may be sealed by the first and second sealing members 21 and 22 on the condition that the nozzle 100 is partially inserted into the opening portion 92b.

The interior of the vacuum insulation panel (VIP) 90 may be provided to communicate with the nozzle 100 on the condition that the opening portion 92b is sealed. Air is suctioned from the interior of the vacuum insulation panel (VIP) 90 by the nozzle 100, resulting in formation of a vacuum in the vacuum insulation panel (VIP) 90.

When a predetermined pressure level is formed in the vacuum insulation panel (VIP) 90 by air suction of the nozzle 100, the nozzle 100 stops suction. Thereafter, the nozzle 100 moves back to the fourth position D so that of the nozzle 100 having been inserted into the opening portion 92b may be partially separated from the opening portion 92b.

The separation position at which the nozzle 100 is separated from the opening portion 92b may enable the opening portion 92b to be continuously kept sealed by pressurization of the first and second sealing members 21 and 22.

A rear side of the second sealing member 22 may be provided with a heat-fusion portion 30 for heat-fusing the opening portion 92b. The heat-fusion portion 30 may act as a heat source such as hot wires, and may provide the opening portion 92b with heat energy so that the opening portion 92b is sealed.

In more detail, the heat-fusion portion 30 having a length corresponding to the length of the second sealing member 22 may be provided at the rear end of the second sealing member 22. When the first and second sealing members 21 and 22 are disposed at the second position B, the heat-fusion portion 30 interacts with the second sealing member 22 so that the heat-fusion portion 30 and the second sealing member 22 may be simultaneously disposed at the second position B.

In this case, the heat-fusion portion 30 is pressed upward against the first sealing member 21, so that the opening portion 92b may be kept sealed.

Thereafter, when the nozzle 100 moves back from the third position C to the fourth position D as described above, the opening portion 92b is kept sealed by the first and second sealing members 21 and 22. In this case, the heat-fusion portion 30 is driven to heat-fuse the sealed opening portion 92b so that the opening portion 92b is permanently sealed.

The scope or spirit of the heat-fusion portion 30 is not limited to the embodiment of the present disclosure, and the heat-fusion portion 30 may also be disposed at the rear side of the first sealing member 21 as necessary.

Steps for forming a vacuum in the vacuum insulation panel (VIP) 90 by the vacuum suction apparatus will hereinafter be sequentially described with reference to the attached drawings.

Referring to FIG. 4A, the vacuum insulation panel (VIP) 90 may be loaded on the rack 11, and the opening portion 92b may be partially accommodated in the accommodation portion 10a after passing through the space between the first sealing member 21 and the second sealing member 22.

In this case, the nozzle 100 provided at the third position C may be partially inserted into the opening portion 92b, and the first sealing member 21 and the second sealing member 22 may be respectively located at the first positions A spaced apart from each other.

Referring to FIG. 4B, each of the first sealing member 21 and the second sealing member 22 may be lifted to the second position B. In this case, since the nozzle 100 is located at the second position B, the first and second sealing members 21 and 22 may seal the opening portion 92b at the second position B by respectively pressing the upper side and the lower side of the nozzle 100.

Thereafter, the nozzle 100 may suction the air (i.e., internal air) from the interior of the vacuum insulation panel (VIP) 90 through a suction force generated by a vacuum pump (not shown). As the internal air of the vacuum insulation panel (VIP) 90 is pumped out, a vacuum is formed in the inner space of the vacuum insulation panel (VIP) 90. In this case, the nozzle 100 may stop suction when internal pressure of the vacuum insulation panel (VIP) 90 reaches a predetermined pressure level.

Referring to FIG. 4C, when the internal pressure of the vacuum insulation panel (VIP) 90 drops to a predetermined pressure or less, the nozzle 100 stops suction and moves back to the fourth position D. As the nozzle 100 moves back, the nozzle 100 may be separated from the opening portion 92b and at the same time may also be separated from the space between the first and second sealing members 21 and 22.

In this case, as described above, the separation position of the nozzle 100 may enable the first and second sealing members 21 and 22 to continuously seal the opening portion 92b through pressurization. After the nozzle 100 moves back to the fourth position D, the heat-fusion portion 30 starts operation such that the opening portion 92b sealed by the first and second sealing members 21 and 22 may be heat-fused.

Upon completion of heat-fusion of the opening portion 92b, the first and second sealing members 21 and 22 may be lifted to the first position A so that the opening portion 92b may be released from a sealed state thereof and a user may take out the vacuum insulation panel (VIP) 90 loaded on the rack 11.

The main body 10 may be provided with a control portion 15 capable of controlling the above-mentioned steps. Although the user can obtain the vacuum insulation panel (VIP) 90 having a vacuum therein by manually adjusting the above-mentioned steps, the user may easily obtain the vacuum insulation panel (VIP) 90 using only one control command due to programming of a series of steps.

The nozzle 100 will hereinafter be described.

FIG. 5 is a perspective view illustrating an external appearance of the nozzle according to an embodiment of the present disclosure. FIG. 6 is a front view illustrating the nozzle according to an embodiment of the present disclosure.

Referring to FIG. 5, a direction corresponding to a horizontal direction of the nozzle 100 may be defined as a first direction X, a direction corresponding to a vertical direction of the nozzle 100 while crossing the first direction X may be defined as a second direction Z, and a direction corresponding to a back-and-forth direction of the nozzle 100 while crossing the first and second directions X and Z may be defined as a third direction Y.

Referring to FIG. 5, the nozzle 100 may include a suction portion 110, a blade portion 120, a protrusion portion 130, and a connection portion 150. The suction portion 110 may suction air. The blade portion 120 may be provided at both sides of the suction portion 110 and may extend from a side of the suction portion 110 in the first direction X. The protrusion portion 130 may protrude forward from a front side of the suction portion 110. The connection portion 150 may be provided at a rear of the suction portion 110.

The nozzle 100 may suction the air from the interior of the vacuum insulation panel (VIP) 90 through the suction portion 110 upon receiving suction force from the vacuum pump (not shown). The nozzle 100 may be formed to communicate with the vacuum pump (not shown) through the nozzle connector 50, such that the nozzle 100 may receive suction force from the vacuum pump (not shown).

In more detail, the suction portion 110 may be formed to communicate with the connection portion 150 provided at the rear of the suction portion 110, and may be connected to the connection portion 150 in a manner that the nozzle connector 50 communicates with the connection portion 150. The nozzle connector 50 may be formed to communicate with the vacuum pump (not shown) through a hose, a tube, or the like, such that the suction force is transferred to the nozzle 100.

The suction portion 110 may include a suction inlet 111 and a hollow-shaped suction channel 112, and may be formed in a tube shape. The suction inlet 111 may be provided at a front of the suction portion 110 so as to suction air. The hollow-shaped suction channel 112 may extend from the suction inlet 111 to the rear side of the suction portion 110.

The suction channel 112 may extend backward from the suction portion 110 (that is, the suction channel 112 may extend in the third direction Y) so as to communicate with the connection portion 150, such that the suction channel 112 may be connected to the nozzle connector 50 through the connection portion 150.

The suction inlet 111 may be provided as a port, at least a portion of which is formed in a round shape. The suction inlet 111 may include a longitudinal direction 111a formed to correspond to the first direction X. That is, the suction inlet 111 may extend in the first direction X.

In other words, the suction inlet 111 may be formed as a port in which a pair of long sides is arranged parallel to the longitudinal direction 111a and the long sides are connected to each other in a round shape. However, the scope or spirit of the present disclosure is not limited thereto, and the suction inlet 111 may also be provided as an oval or elongated round-shaped port having a long axis in the first direction X.

The longitudinal direction 111a of the suction inlet 111 according to one embodiment of the present disclosure may denote a horizontal direction, and the vertical direction 111b perpendicular to the longitudinal direction 111a may denote a height direction.

The suction portion 110 may be formed in a tube shape that covers the suction inlet 111 and the suction channel 112 formed by the suction inlet 111 and extends in the third direction Y. The external appearance of the suction portion 110 may be formed in a rectangular column shape that includes a first side 110a corresponding to the longitudinal direction 111a of the suction inlet 111 and a second side 110b corresponding to the vertical direction 111b. The first side 110a may correspond to the first direction X, and the second side 110b may correspond to the second direction Z. In other words, the suction portion 110 may extend in the first direction X, and the second side 110b may be defined as a length of the height of the suction portion 110.

However, the scope or spirit of the present disclosure is not limited thereto, and the appearance of the suction portion 110 may be formed in an outer circumferential shape corresponding to an inner circumferential shape formed by the suction channel 112 of the suction portion 110.

As described above, the suction portion 110 may be formed in a flat tubular shape including the first side 110a corresponding to the longitudinal direction 111a of the suction inlet 111, such that the size of a leak occurring when the opening portion 92b of the vacuum insulation panel (VIP) 90 is sealed can be minimized.

The first and second sealing members 21 and 22 are sealed while being in contact with the nozzle 100 at the second position B on the condition that the nozzle 100 is located at the second position B. Thus, the first sealing member 21 is spaced apart from the second sealing member 22 by a predetermined separation distance corresponding to the length of the second side 110b, resulting in the occurrence of a leak in the opening portion 92b of the vacuum insulation panel (VIP) 90. Here, the length of the second side 110b may be formed in the second direction Z, and may correspond to the height of the nozzle 100.

Therefore, as the second side 110b is gradually reduced in length, the separation distance between the first sealing member 21 and the second sealing member 22 is gradually reduced, resulting in reduction in leak size. However, when the length of the second side 110b is reduced, the length of the longitudinal direction 111a of the suction inlet 111 is also reduced by the reduced length of the second side 110b. As a result, a cross-sectional area of the suction inlet 111 is reduced in size so that the amount of air suctioned through the suction inlet 111 is reduced, resulting in reduction in suction efficiency of the vacuum suction apparatus 1.

Therefore, in order to reduce the size of a leak by reducing the length of the second side 110b as well as to acquire the cross-sectional area of the suction inlet 111 by allowing a predetermined length of the first side 110a to be used as a long side, the vacuum suction portion 110 may be formed in a flat shape.

The second side 110b may have a length of about 2.5 cm at which the leak size is minimized and the suction force is maintained. More preferably, the length of the second side 110b may be equal to or shorter than 5 cm. When the length of the second side 110b is longer than 5 cm, the size of a leak occurring between the first sealing member 21 and the second sealing member 22 increases such that efficiency of the vacuum suction apparatus 1 may be deteriorated. Thus, it is desirable that the length of the second side 110b be equal to or shorter than 5 cm.

Even when the length of the second side 110b is reduced for leak reduction, the separation distance between the first sealing member 21 and the second sealing member 22 may still occur by the length of the second side 110b, resulting in formation of a leak.

In order to address the above issues, the nozzle 100 according to one embodiment of the present disclosure may include a blade portion 120 provided at both sides of the suction portion 110.

The blade portion 120 may be formed to extend outward from the second side 110b provided at both sides of the suction portion 110. The blade portion 120 is integrated with the suction portion 110 as one body and extends from the suction portion 110. However, the scope or spirit of the present disclosure is not limited thereto, and the blade portion 120 may also be assembled as a separate structure as necessary.

The scope or spirit of the blade portion 120 is not limited to the present disclosure, and the blade portion 120 may extend in the first direction X at one side of the suction portion 110, instead of at both sides of the suction portion 110.

The blade portion 120 may extend in the first direction X and may have a height in the second direction Z.

The blade portion 120 may include a first side 121 and a second side 122. The first side 121 may extend from an upper side (i.e., an upper end of the second side 110b) of the suction portion 110. The second side 122 may extend from a lower side (i.e., a lower end of the second side 110b) of the suction portion 110.

A distance between one end of the first side 121 and one end of the second side 122 may be longer than a distance between the other end of the first side 121 and the other end of the second side 122. Here, the one end of the first side 121 and the one end of the second side 122 may be brought into contact with the suction portion 110 formed in the second direction Z. The other end of the first side 121 and the other end of the second side 122 may also be formed in the second direction Z, and may be located at the outer side of the suction portion 110. In other words, the length of the height of the blade portion 120 adjacent to the suction portion 110 may be longer than the length of the height of the other blade portion 120 located far from the suction portion 110.

When the side of the suction portion 110 is used as a bottom side acting as a base line, the blade portion 120 may be formed in a triangular column shape in which the length of the height of the blade portion 120 is gradually reduced in the direction from the bottom side to the outer side of the suction portion 110. However, the scope or spirit of the present disclosure is not limited thereto, and the blade portion 120 may also be formed in a tapered column shape as necessary.

However, the scope or spirit of the present disclosure is not limited thereto, and the length of the height of the blade portion 120 may not be gradually reduced in the direction from the bottom side to the outer side of the blade portion 120. That is, the height of the blade portion 120 may be kept at a predetermined level in some parts of a section formed between the suction portion 110 and the outer side of the blade portion 120. In the some parts of the section, the length of the height of the blade portion 120 may be temporarily longer than the length of the height of the blade portion 120 located closer to the suction portion 110 than the some parts of the section.

However, finally, as described above, the distance between one ends of the first and second sides 121 and 122 on the condition that the one ends of the first and second sides 121 and 122 are adjacent to the suction portion 110 may be longer than the distance between the other ends of the first and second sides 121 and 122 on the condition that the other ends of the first and second sides 121 and 122 are located at the outer side of the suction portion 110.

In other words, the blade portion 120 or the first and second sides 121 and 122 may be formed to have a tapered portion.

The blade portion 120 may extend in the longitudinal direction of the first side 110a to fill the separation (or spacing) caused by the length of the second side 110b, and may thus prevent a leak from occurring.

Specifically, the blade portion 120 may reduce a height difference caused by the length of the second side 110b using the first and second sides 121 and 122 thereof, and may thus prevent the separation (or spacing) from occurring between the first sealing member 21 and the second sealing member 22.

The first and second sides 121 and 122 may be provided to face each other. Since the first and second sides 121 and 122 are oriented in different diagonal directions symmetrical to each other, the first and second sides 121 and 122 may be brought into contact with each other at one point located at the outer side of the suction portion 110.

In this case, an angle (θ) formed by arrangement of the first and second sides 121 and 122 at the one point may be in a range of 0.1° to 30°. Preferably, the angle (θ) may be set to about 5° so that it is possible to efficiently prevent the leak from occurring. The angle of 5° may be calculated with respect to the second side 110b having the length of about 2.5 cm.

In this case, the distance from one end of the blade portion 120 to the other end of the blade portion 120 may be longer than the length of the first side 110a of the suction portion 110.

The blade portion 120 may extend from both sides of the suction portion 110 as described above, such that one pair of blade portions 120 may be provided. In this case, whereas the one pair of blade portions 120 may be provided in a symmetrical shape as shown in the above embodiment, the scope or spirit of the present disclosure is not limited thereto, and the blade portions 120 paired with each other may be provided to have different angles and difference sizes in an asymmetrical shape.

A protrusion portion 130 protruding forward from the suction portion 110 may be provided at the front side of the suction portion 110. In other words, the protrusion portion 130 may extend from the front side of the suction portion 110 in the third direction Y.

The protrusion portion 130 may extend forward from both sides of the longitudinal direction 111a of the suction inlet 111, such that one pair of the protrusion portions 130 (i.e., two protrusion portions) may be used. However, the scope or spirit of the present disclosure is not limited thereto, and it should be noted that the protrusion portion 130 may also be implemented as a single protrusion.

The protrusion portion 130 is formed at the front of the suction inlet 111. As a result, when the air is suctioned from the interior of the outer skin material 92 of the vacuum insulation panel (VIP) 90, the protrusion portion 130 may prevent the outer skin material 92 from sticking to the front of the suction inlet 111 such that the air suction channel is prevented from being limited.

That is, the protrusion portion 130 may prevent the outer skin material 92 from being located at the air channel formed at the front of the suction inlet 111, resulting in increase in air suction efficiency.

The length of the height of one end of the protrusion portion 130 adjacent to the suction portion 110 may be longer than the height of the height of the other end of the protrusion portion 130 located at the outer side of the suction portion 110. Thus, after the nozzle 100 stops air suction, the nozzle 100 may move back to the fourth position D while simultaneously maintaining the sealed state of the opening portion 92b.

In other words, the protrusion portion 130 may be formed in a tapered column shape extending in a forward direction of the suction portion 110 when the front side of the suction portion 110 is used as a base line. When the nozzle 100 moves back, the protrusion portion 130 may maintain the sealed state of the opening portion 92b by minimizing the separation (or spacing) between the protrusion portion 130 and the opening portion 92b.

For this reason, the length of the height of the front side of the suction portion 110 from which the protrusion portion 130 extends may be shorter than the length of the height of the rear side of the suction portion 110.

Therefore, the protrusion portion 130 may include an upper side extending in the third direction Y at an upper part of the front side of the suction portion 110, and a lower side extending in the third direction Y at a lower part of the front side of the suction portion 110.

The upper side and the lower side of the protrusion portion 130 may be located to face each other, and may be oriented in different diagonal directions symmetrical to each other. In more detail, the upper side of the protrusion portion 130 and the lower side of the protrusion portion may be diagonally arranged in a manner that a thickness of the outer side of the protrusion portion 130 is less than a thickness of one side adjacent to the suction portion 110.

When the upper side and the lower side of the protrusion portion 130 are arranged, it is desirable that the angle between the upper side and the lower side be in the range of 0.1° to 60°.

When the protrusion portion 130 is formed in a tapered column shape, the user may easily insert the nozzle 100 into the opening portion 92b after loading the vacuum insulation panel (VIP) 90 on the rack 11.

In the nozzle 100, if it is assumed that the front side of the suction portion 110 including both the protrusion portion 130 and the suction inlet 111 is defined as a first region, and a region (i.e., the rear side of the suction portion 110 and the blade portion 120) located at the rear of the first region is defined as a second region, a horizontal length of the first region formed to correspond to the first direction X may be shorter than a horizontal length of the second region formed to correspond to the first direction X.

In this case, the horizontal length may refer to a longitudinal direction corresponding to the longitudinal direction 111a of the suction inlet 111. If necessary, the horizontal length may also be used as a vertical length. In accordance with one embodiment of the present disclosure, the above-mentioned horizontal length may be limited only to the horizontal length of the nozzle 100.

The first region is not sealed by the sealing unit 20, and no separation (no spacing) occurs in the first region when the first and second sealing members 21 and 22 are sealed. Therefore, in the first region, the length of the height of the blade portion 120 need not be gradually reduced in the direction approaching the outer side of the blade portion 120.

Accordingly, the blade portion such as the second region need not be used, such that it is desirable that the first region be formed to be shorter than the horizontal length of the second region in terms of reduction in production costs.

However, the second region is brought into contact with the first and second sealing members 21 and 22 when the opening portion 92b is sealed by the sealing unit 20. Thus, in order to minimize the size of a leak, the length of the height needs to be gradually reduced in the direction approaching the outer side, such that the second region needs to have a longer horizontal length as compared to the first region.

Nozzles 200 and 200' according to another embodiment of the present disclosure will hereinafter be described. In the nozzles 200 and 200', the remaining constituent elements other than the protrusion portions 230 and 230' and the suction portions 210 and 210' are identical to those of the above-mentioned embodiment, and as such a detailed description thereof will herein be omitted for convenience of description.

FIG. 8 is a perspective view illustrating an external appearance of a nozzle according to another embodiment of the present disclosure. FIG. 9 is a perspective view illustrating an external appearance of a nozzle according to another embodiment of the present disclosure.

Referring to FIGS. 8 and 9, the nozzle 200 may include at least two protrusion portions 230, and the nozzle 200' may include at least two protrusion portions 230'.

Referring to FIG. 8, the nozzle 200 may include four protrusion portions 230 extending forward from the suction portion 210. In the suction inlet 111 including the longitudinal direction 111a according to the above-mentioned embodiment, when the nozzle 100 starts air suction, two protrusion portions 130 (one pair of protrusion portions 130) are spaced apart from each other by a predetermined separation (or spacing) such that the outer skin material 92 easily sticks to the separation (or spacing) between the protrusion portions 130, resulting in limitation in air suction channel.

In order to address the above issues, not only the two protrusion portions 230 provided at both ends of the suction portion 210, but also additional protrusion portions 230 located between the two protrusion portions 230 may be used, such that the suction channel may be efficiently obtained.

The suction inlet 211 may be disposed between the protrusion portions 230. Therefore, the nozzle 200 according to another embodiment may include three suction inlets 211. As a result, the suction channel is guaranteed by the plurality of protrusion portions 230, and at the same time an overall cross-sectional area of the suction inlet 211 is enlarged by the plurality of the suction inlets 111, resulting in increase in the amount of air suction.

Referring to FIG. 9, the nozzle 200' may include 6 protrusion portions 230' extending forward from the suction portion 210'. Therefore, the nozzle 200' according to another embodiment may include 5 suction inlets 211'.

Nozzles 300 and 300' according to another embodiment of the present disclosure will hereinafter be described in detail. In the nozzles 300 and 300', the remaining constituent elements other than the blade portions 320 and 320' are identical to those of the aforementioned embodiment, and as such a detailed description thereof will herein be omitted for convenience of description.

FIG. 10 is a perspective view illustrating an external appearance of a nozzle according to another embodiment of the present disclosure. FIG. 11 is a front view illustrating a nozzle according to another embodiment of the present disclosure. FIG. 12 is a front view illustrating a nozzle according to another embodiment of the present disclosure.

Referring to FIGS. 10 and 11, a first side 321 and a second side 322 may be brought into contact with each other in an asymmetrical shape, differently from the blade portion 120 illustrated in the aforementioned embodiment. In more detail, whereas the second side 322 extends outward from the suction portion 310 in the direction parallel to the first side 321 of the suction portion 310, the first side 321 may extend outward from the suction portion 310 in a diagonal direction in a different way from the second side 322.

Accordingly, the first side 321 may be brought into contact with the second side 322 by extending downward, and the side surface of the suction portion 310 and the second side 322 are perpendicular to each other such that the blade portion may be formed in a right-angled triangular column shape.

When the second side 322 is provided on an extension line of the first side 321 of the suction portion 310 in the same manner as in another embodiment of the present disclosure, one side of the nozzle 300 is formed without causing a step difference therein, such that the nozzle 300 and the second sealing member 22 may be in contact with each other without causing the separation (or spacing) there between during the sealing using the nozzle 300, resulting in a minimum size of the leak occurring in the second sealing member 22.

Referring to FIG. 12, in an opposite way to the aforementioned embodiment, the blade portion 320' may include a first side 321' and a second side 322'. The first side 321' may extend outward from the suction portion 310' in the direction parallel to the first side 321' of the suction portion 310', and the second side 322' may extend outward from the suction portion 310' in the diagonal direction.

Therefore, the second side 322' may be brought into contact with the first side 321' by extending upward, and the side of the suction portion 310' and the first side 321' are perpendicular to each other, such that the blade portion 320' may be formed in a right-angled triangular column shape.

Accordingly, during the sealing using the nozzle 300', the nozzle 300' may be brought into contact with the first sealing member 21 without the separation (o spacing) therebetween, resulting in a minimum size of the leak occurring in the first sealing member 21.

Nozzles 400 and 400' according to another embodiment of the present disclosure will hereinafter be described in detail. In the nozzles 400 and 400', the remaining constituent elements other than the blade portions 420 and 420' and the protrusion portions 430 and 430' are identical to those of the aforementioned embodiment, and as such a detailed description thereof will herein be omitted for convenience of description.

FIG. 13 is a perspective view illustrating an external appearance of a nozzle according to another embodiment of the present disclosure. FIG. 14 is a perspective view illustrating an external appearance of a nozzle according to another embodiment of the present disclosure.

Referring to FIG. 13, an extension portion 440 for interconnecting the protrusion portion 430 and the blade portion 420 may be disposed between the other end of the protrusion portion 430 of the nozzle 400 and the other end of the blade portion 420.

A section between the outer edge of the extension portion 440 (i.e., the other end of the protrusion portion 430) and the other end of the blade portion 420 may be formed in a round shape.

In addition, a thickness of the extension portion 440 may be provided to correspond to a thickness of the blade portion 420 and the protrusion portion 430. That is, the length of the height of one end of the extension portion 440 adjacent to the suction portion 410 may be longer than the length of the height of the other end of the extension portion 440 located at the outer side of the suction portion 410.

A round shape formed at the outer edge of the extension portion 440 may be formed in a concave shape.

Referring to FIG. 14, a round shape formed at the outer edge of the extension portion 440' may be formed in a convex shape. In this case, the other end of the blade portion 420' may be formed in a round shape connected in conjunction with the round shape of the extension portion 440'.

As a result, the nozzle 400' may be provided in a circular plate shape.

The outline of the nozzle 400' according to another embodiment of the present disclosure may be formed in a round shape in the third direction Y along which the extension portion 440' is formed, and the outline of the nozzle 400' formed to correspond to the first and second directions X and Z may also be formed in a round shape.

That is, the outline of the nozzle 400' formed in the range from the center of the suction portion 410' arranged in the second direction Z to the outer end of the blade portion 420' may also be formed in a round shape. However, the scope or spirit of the present disclosure is not limited thereto, and all parts of the outline forming the nozzle 400' may also be formed in a round shape as necessary.

The nozzle 100 according to another embodiment of the present disclosure will hereinafter be described. The remaining constituent elements other than the nozzle 100 are identical to those of the aforementioned embodiment, and as such a detailed description thereof will herein be omitted for convenience of description.

FIG. 15 is a perspective view illustrating some parts of an external appearance of the vacuum suction apparatus according to another embodiment of the present disclosure. FIG. 16 is a perspective view illustrating some parts of an external appearance of the vacuum suction apparatus according to another embodiment of the present disclosure.

Referring to FIGS. 15 and 16, the vacuum suction apparatus 1 according to another embodiment may include a plurality of nozzles 100. That is, several nozzles 100 may be disposed between the first sealing member 21 and the second sealing member 22, and the nozzles 100 may be inserted into the opening portion 92b of a single vacuum insulation panel (VIP) 90, such that air is simultaneously suctioned from the interior of the vacuum insulation panel (VIP) 90.

Therefore, it is possible to reduce a working time needed to form a vacuum in the vacuum insulation panel (VIP) 90. Specifically, when forming a vacuum in a large-capacity vacuum insulation panel (VIP) 90, it takes a long working time to form a vacuum in the large-capacity VIP 90. However, the vacuum suction apparatus 1 may greatly reduce a working time needed for such vacuum information.

The nozzles 100 may be respectively connected to nozzle connectors 50, and each of the nozzle connectors 50 is connected to the vacuum pump (not shown), such that the nozzles 100 may receive suction force from the vacuum pump.

The nozzle 100 according to another embodiment of the present disclosure will hereinafter be described. The remaining constituent elements other than the nozzle 100 and the nozzle connector 50' are identical to those of the aforementioned embodiment, and as such a detailed description thereof will herein be omitted for convenience of description.

The vacuum suction apparatus 1 according to another embodiment may include a plurality of nozzles 100. That is, several nozzles 100 may be disposed between the first sealing member 21 and the second sealing member 22, and the nozzles 100 may be inserted into the opening portion 92b of a single vacuum insulation panel (VIP) 90, such that air is simultaneously suctioned from the interior of the vacuum insulation panel (VIP) 90.

Therefore, it is possible to reduce a working time needed for forming a vacuum in the vacuum insulation panel (VIP) 90. Specifically, when forming a vacuum in a large-capacity vacuum insulation panels (VIPs) 90, it takes a long working time to form a vacuum in the large-capacity VIP 90. However, the vacuum suction apparatus 1 may greatly reduce a working time needed for such vacuum information.

However, differently from the aforementioned embodiment, the plurality of nozzles 100 may be formed to communicate with the vacuum pump (not shown) by connecting to the single nozzle connector 50'.

The nozzle connector 50' may include a divider 50a' formed to communicate with the connection portions 150' of the nozzles 100. The divider 50a' may perform division of the suction force generated by the vacuum pump (not shown) at one end of the nozzle connector 50', such that the suction force may be transferred through the plurality of air channels.

As a result, the suction force may be transferred to the plurality of nozzles 100 through the single nozzle connector 50'.

Although the embodiments of the present disclosure have been disclosed for illustrative purposes, those skilled in the art will appreciate that various modifications, additions and substitutions are possible, without departing from the scope and spirit of the invention as disclosed in the accompanying claims.

The invention claimed is:

1. A vacuum suction apparatus including a nozzle formed to suction air to form a vacuum in a vacuum insulation panel or a vacuum pouch, comprising:
the nozzle including:
a suction portion configured to suction air, the suction portion extending to have a width defined in a first direction, a height defined in a second direction, and a length defined in a third direction perpendicular to the first direction, the suction portion comprising:
a front end and a rear end located on opposite ends of the suction portion along the length of the suction portion,
a suction inlet provided at the front end for suctioning air, and
a side portion disposed outside the suction inlet in the first direction;
a blade portion extending in the first direction from the side portion of the suction portion and having a first height defined in the second direction, the blade portion including a body comprising a first side adjacent to a top side of the side portion and a second side adjacent to a bottom side of the side portion; and
a protrusion portion protruding from the front end of the suction portion in the third direction and including at least one protrusion extending from the side portion,
wherein the first height of an inner end of the blade portion adjacent to the suction portion is greater than a second height of an outer end of the blade portion,
wherein the front end of the suction portion extends past a front edge of the blade portion in the third direction,
wherein the at least one protrusion protrudes beyond the suction inlet and the blade portion in the third direction,
wherein the blade portion extends beyond the at least one protrusion in the first direction,
wherein a front end of a center portion in the first direction of the suction inlet and a front end of a side end portion in the first direction of the suction inlet are disposed in a same position in the third direction such that an opening defining a front end of the suction inlet is planar,
wherein the suction portion comprises a rectangular cross section when viewed along the third direction, and the blade portion extends from an edge of the suction portion and comprises a triangular cross section when viewed along the third direction,
wherein the blade portion is disposed outside of the suction portion, and
wherein an angle formed by arrangement of the first side and the second side at the outer end of the blade portion is in a range of 0.1° to 30°.

2. The vacuum suction apparatus according to claim 1, wherein:
the first side includes a first inner edge along the suction portion and a first outer edge opposite to the first inner edge; and
the second side includes a second inner edge along the suction portion and a second outer edge opposite to the second inner edge,
wherein a distance between the first inner edge and the second inner edge is greater than a distance between the first outer edge and the second outer edge.

3. The vacuum suction apparatus according to claim 2, wherein the first side and the second side of the blade portion converge along the first direction.

4. The vacuum suction apparatus according to claim 2, wherein:
a separation distance between the first inner edge of the first side and the second inner edge of the second side in the second direction is equal to or less than 5 cm.

5. The vacuum suction apparatus according to claim 1, wherein the suction portion comprises:
a suction channel extending from the suction inlet in the third direction.

6. The vacuum suction apparatus according to claim 5, wherein:
a ratio of a first maximum length of the suction inlet formed in the first direction to a second maximum length of the suction inlet formed in the second direction is at least 5:1.

7. The vacuum suction apparatus according to claim 1, wherein:
a first height of an inner end of the protrusion portion adjacent to the suction portion is greater than a second height of an outer end of the protrusion portion.

8. The vacuum suction apparatus according to claim 7, wherein the protrusion portion comprises:
a top surface extending in the third direction from an upper side of the front end of the suction portion; and
a bottom surface extending in the third direction from a lower side of the front end of the suction portion in a manner to face an opposite direction than the top surface,
wherein an angle formed by arrangement of the top surface and the bottom surface at the outer end of the protrusion portion is in a range of 0.1° to 60°.

9. The vacuum suction apparatus according to claim 1, wherein the at least one protrusion includes a pair of protrusions disposed apart from each other in the first direction.

10. The vacuum suction apparatus according to claim 1, wherein: the at least one protrusion includes a plurality of protrusions respectively protruding from the suction portion in the third direction,
wherein the suction inlet for air suction is provided between the plurality of protrusions.

11. The vacuum suction apparatus according to claim 1, wherein the nozzle includes a plurality of suction inlets.

12. The vacuum suction apparatus according to claim 1, wherein the nozzle includes:
a first region defined as a region ranging from a front end of the protrusion portion to a front side of the suction inlet; and
a second region defined by a region ranging from a rear end of the protrusion portion to a rear side of the nozzle,
wherein a ratio of a first length of the first region provided in the third direction to a second length of the second region provided in the third direction is at least 1:2.

13. The vacuum suction apparatus according to claim 12, further comprising:
an extension portion connecting the front end of the protrusion portion and the blade portion in a round shape.

14. A vacuum suction apparatus including a plurality of nozzles formed to suction air to form a vacuum in a vacuum insulation panel or a vacuum pouch, comprising:
a divider configured to divide suction force between the plurality of the nozzles; and each nozzle of the plurality of nozzles including:
a suction portion configured to suction air, the suction portion extending to have a width defined in a first direction, a height defined in a second direction, and a length defined in a third direction perpendicular to the first direction, the suction portion comprising:
a front end and a rear end located on opposite ends of the suction portion along the length of the suction portion,
a suction inlet provided at the front end for suctioning air, and
a side portion disposed outside the suction inlet in the first direction;
a blade portion extending in the first direction from the side portion of the suction portion and having a first height defined in the second direction, the blade portion including a body comprising a first side adjacent to a top side of the side portion and a second side adjacent to a bottom side of the side portion; and
a protrusion portion protruding from the front end of the suction portion in the third direction and extending from the side portion,
wherein the first height of an inner end of the blade portion adjacent to the suction portion is greater than a second height of an outer end of the blade portion,
wherein the front end of the suction portion extends past a front edge of the blade portion in the third direction,
wherein the protrusion portion protrudes beyond the suction inlet and the blade portion in the third direction,
wherein the blade portion extends beyond the protrusion portion in the first direction,
wherein a front end of a center portion in the first direction of the suction inlet and a front end of a side end portion in the first direction of the suction inlet are disposed in a same position in the third direction such that an opening defining a front end of the suction inlet is planar,
wherein the suction portion comprises a rectangular cross section when viewed along the third direction, and the blade portion extends from an edge of the suction portion and comprises a triangular cross section when viewed along the third direction,
wherein the blade portion is disposed outside of the suction portion, and
wherein an angle formed by arrangement of the first side and the second side at the outer end of the blade portion is in a range of 0.1° to 30°.

15. The vacuum suction apparatus according to claim 14, wherein:
the first side includes a first inner edge along the suction portion and a first outer edge opposite to the first inner edge; and
the second side includes a second inner edge along the suction portion and a second outer edge opposite to the second inner edge,
wherein a distance between the first inner edge and the second inner edge is greater than a distance between the first outer edge and the second outer edge.

16. The vacuum suction apparatus according to claim 15, wherein the first side and the second side of the blade portion converge along the first direction.

17. The vacuum suction apparatus according to claim 14, wherein the suction portion comprises a suction channel extending from the suction inlet in the third direction.

* * * * *